(12) United States Patent
Balan et al.

(10) Patent No.: US 11,755,760 B2
(45) Date of Patent: Sep. 12, 2023

(54) SYSTEMS AND METHODS FOR SECURE POLICIES-BASED INFORMATION GOVERNANCE

(71) Applicant: ASG Technologies Group, Inc., Waltham, MA (US)

(72) Inventors: Sudhi Balan, Fairfield, CT (US); Randy Baiad, Brookfield, CT (US); Robert Russell, New Canaan, CT (US)

(73) Assignee: ASG Technologies Group, Inc., Waltham, MA (US)

( * ) Notice: Subject to any disclaimer, the term of this patent is extended or adjusted under 35 U.S.C. 154(b) by 92 days.

(21) Appl. No.: 17/068,702

(22) Filed: Oct. 12, 2020

(65) Prior Publication Data

US 2021/0120044 A1 Apr. 22, 2021

Related U.S. Application Data

(60) Provisional application No. 62/923,381, filed on Oct. 18, 2019.

(51) Int. Cl.
*G06F 21/00* (2013.01)
*G06F 21/62* (2013.01)
(Continued)

(52) U.S. Cl.
CPC ........ *G06F 21/6218* (2013.01); *G06F 3/0482* (2013.01); *G06F 3/0483* (2013.01);
(Continued)

(58) Field of Classification Search
CPC .. G06F 21/6218; G06F 3/0482; G06F 3/0483; G06F 16/211; G06F 16/256;
(Continued)

(56) References Cited

U.S. PATENT DOCUMENTS 5,321,610 A 6/1994 Breslin
5,528,263 A 6/1996 Platzker et al.
(Continued)

FOREIGN PATENT DOCUMENTS

CA 3099783 A1 11/2019
EP 3430529 A1 1/2019
(Continued)

OTHER PUBLICATIONS

Bourgoiun et al., "Towards a Process Analysis Approach to Adopt Robotic Process Automation", IEEE, 2018, 8 pages.
(Continued)

*Primary Examiner* — Ghazal B Shehni
(74) *Attorney, Agent, or Firm* — Carr & Ferrell LLP

(57) ABSTRACT

The disclosure is directed to systems and methods for secure policies-based information governance. In various embodiments exemplary methods include displaying a Graphical User Interface (GUI), the graphical user interface receiving a business rule input from a business user; receiving a policy from a policy engine based on the business rule input, the policy engine generating a policy hierarchy; and defining a plurality of domain objects and a plurality of domain object representations in the Graphical User Interface (GUI) based on the policy and the policy hierarchy. Furthermore, exemplary methods include defining an extensible hierarchical domain model definition using the policy hierarchy, the extensible hierarchical domain model definition being modified using the plurality of domain object representations in the Graphical User Interface (GUI); and defining a Policy Enforcement Point (PEP) in an application based on the extensible hierarchical domain model definition.

20 Claims, 17 Drawing Sheets

(51) Int. Cl.
| | |
|---|---|
| *G06F 40/106* | (2020.01) |
| *G06F 3/0483* | (2013.01) |
| *G06F 3/0482* | (2013.01) |
| *G06F 16/25* | (2019.01) |
| *G06F 21/31* | (2013.01) |
| *H04L 9/40* | (2022.01) |
| *G06F 16/21* | (2019.01) |
| *G06F 21/60* | (2013.01) |
| *G06N 5/01* | (2023.01) |

(52) U.S. Cl.
CPC .......... *G06F 16/211* (2019.01); *G06F 16/256* (2019.01); *G06F 21/31* (2013.01); *G06F 21/604* (2013.01); *G06F 40/106* (2020.01); *G06N 5/01* (2023.01); *H04L 63/101* (2013.01); *H04L 63/102* (2013.01); *H04L 63/105* (2013.01); *H04L 63/205* (2013.01); *G06F 2221/2141* (2013.01)

(58) Field of Classification Search
CPC ...... G06F 21/31; G06F 21/604; G06F 40/106; G06F 2221/2141; G06F 21/6209; G06F 21/6227; G06F 21/6245; H04L 63/102; H04L 63/105; H04L 63/205; H04L 63/101; G06N 5/01; G06N 5/04
See application file for complete search history.

(56) References Cited

U.S. PATENT DOCUMENTS

| | | | |
|---|---|---|---|
| 5,742,285 A | 4/1998 | Ueda | |
| 5,911,143 A | 6/1999 | Deinhart et al. | |
| 6,069,957 A | 5/2000 | Richards | |
| 6,208,345 B1 | 3/2001 | Sheard et al. | |
| 6,331,855 B1 | 12/2001 | Schauser | |
| 6,574,321 B1 | 6/2003 | Cox et al. | |
| 6,597,363 B1 | 7/2003 | Duluk | |
| 6,950,825 B2 | 9/2005 | Chang et al. | |
| 7,073,164 B1 | 7/2006 | Knowles | |
| 7,185,192 B1 | 2/2007 | Kahn | |
| 7,359,076 B2 | 4/2008 | Uchino | |
| 7,937,665 B1 | 5/2011 | Vazquez et al. | |
| 8,078,731 B1 | 12/2011 | Bruder et al. | |
| 8,667,456 B1 | 3/2014 | Czymontek | |
| 8,745,011 B2 | 6/2014 | Kishi | |
| 9,032,076 B2 | 5/2015 | Buehler et al. | |
| 9,053,295 B1 | 6/2015 | Wick et al. | |
| 9,213,707 B2 | 12/2015 | Conner | |
| 9,232,491 B2 | 1/2016 | Mahaffey | |
| 9,430,125 B1* | 8/2016 | Blitzer | G06F 16/24564 |
| 9,483,537 B1 | 11/2016 | Peters et al. | |
| 9,621,428 B1 | 4/2017 | Lev et al. | |
| 9,910,655 B1 | 3/2018 | Ranganathan et al. | |
| 10,162,624 B1 | 12/2018 | Moturu et al. | |
| 10,181,059 B1 | 1/2019 | Brewton et al. | |
| 10,355,864 B2 | 2/2019 | Konduru | |
| 10,318,762 B1 | 6/2019 | Buckingham et al. | |
| 10,348,505 B1 | 7/2019 | Crawforth et al. | |
| 10,812,611 B2 | 10/2020 | Bennet et al. | |
| 10,877,740 B2 | 12/2020 | Bennet et al. | |
| 10,990,689 B1* | 4/2021 | Reiner | G06F 21/604 |
| 11,055,067 B2 | 7/2021 | Thangaraj et al. | |
| 11,057,500 B2 | 7/2021 | Aragón et al. | |
| 11,086,751 B2 | 8/2021 | Moresmau et al. | |
| 11,172,042 B2 | 11/2021 | Bennet et al. | |
| 11,269,660 B2 | 3/2022 | Yueh | |
| 2002/0099952 A1 | 7/2002 | Lambert et al. | |
| 2002/0103731 A1 | 8/2002 | Barnard et al. | |
| 2002/0184610 A1 | 12/2002 | Chong et al. | |
| 2002/0196277 A1 | 12/2002 | Bushey et al. | |
| 2003/0046401 A1 | 3/2003 | Abbott et al. | |
| 2003/0079052 A1 | 4/2003 | Kushnirskiy | |
| 2004/0003119 A1 | 1/2004 | Munir et al. | |
| 2004/0003371 A1 | 1/2004 | Coulthard et al. | |
| 2004/0078373 A1 | 4/2004 | Ghoneimy et al. | |
| 2004/0128001 A1 | 7/2004 | Levin et al. | |
| 2004/0153994 A1 | 8/2004 | Bates et al. | |
| 2004/0177323 A1 | 9/2004 | Kaasila et al. | |
| 2004/0267749 A1 | 12/2004 | Bhat et al. | |
| 2005/0038764 A1 | 2/2005 | Minsky et al. | |
| 2005/0065845 A1 | 3/2005 | DeAngelis | |
| 2005/0108526 A1 | 5/2005 | Robertson | |
| 2005/0235258 A1 | 10/2005 | Wason | |
| 2005/0278695 A1 | 12/2005 | Synovic | |
| 2006/0026591 A1 | 2/2006 | Backhouse | |
| 2006/0031854 A1 | 2/2006 | Godwin | |
| 2006/0036448 A1 | 2/2006 | Haynie et al. | |
| 2006/0036941 A1 | 2/2006 | Neil | |
| 2006/0039466 A1 | 2/2006 | Emerson et al. | |
| 2006/0111888 A1 | 5/2006 | Hiew et al. | |
| 2006/0129817 A1 | 6/2006 | Borneman et al. | |
| 2006/0184925 A1 | 8/2006 | Ficatier et al. | |
| 2006/0251047 A1 | 11/2006 | Shenfield et al. | |
| 2006/0265719 A1 | 11/2006 | Asti | |
| 2006/0271528 A1 | 11/2006 | Gorelik | |
| 2006/0294151 A1 | 12/2006 | Wong | |
| 2007/0016624 A1 | 1/2007 | Powers et al. | |
| 2007/0028286 A1 | 2/2007 | Greene et al. | |
| 2007/0030528 A1 | 2/2007 | Qwuaeier et al. | |
| 2007/0033637 A1 | 2/2007 | Yami et al. | |
| 2007/0073671 A1 | 3/2007 | McVeigh et al. | |
| 2007/0094594 A1 | 4/2007 | Matichuk | |
| 2007/0135936 A1 | 6/2007 | Dumas | |
| 2007/0156764 A1 | 7/2007 | O'Connell et al. | |
| 2007/0180367 A1 | 8/2007 | Chiang | |
| 2007/0180444 A1 | 8/2007 | Hoover et al. | |
| 2007/0198450 A1 | 8/2007 | Khalsa | |
| 2007/0208685 A1 | 9/2007 | Blumenau | |
| 2007/0266394 A1 | 11/2007 | Odent et al. | |
| 2007/0294406 A1 | 12/2007 | Suer et al. | |
| 2008/0109292 A1 | 5/2008 | Moore | |
| 2008/0120302 A1 | 5/2008 | Thompson et al. | |
| 2008/0126932 A1 | 5/2008 | Elad et al. | |
| 2008/0141141 A1 | 6/2008 | Moore | |
| 2008/0189617 A1 | 8/2008 | Covell et al. | |
| 2008/0209390 A1 | 8/2008 | Dutta et al. | |
| 2008/0229303 A1 | 9/2008 | Carteri et al. | |
| 2008/0281727 A1 | 11/2008 | Moss | |
| 2009/0024589 A1 | 1/2009 | Sood | |
| 2009/0024660 A1 | 1/2009 | Borgsmidt et al. | |
| 2009/0025063 A1 | 1/2009 | Thomas | |
| 2009/0083306 A1 | 3/2009 | Sichi et al. | |
| 2009/0094112 A1 | 4/2009 | Cesarini et al. | |
| 2009/0124387 A1 | 5/2009 | Perlman et al. | |
| 2009/0164878 A1 | 6/2009 | Cottrille | |
| 2009/0249290 A1 | 10/2009 | Jenkins et al. | |
| 2009/0249446 A1 | 10/2009 | Jenkins et al. | |
| 2010/0030890 A1* | 2/2010 | Dutta | G06Q 10/06 709/224 |
| 2010/0106560 A1 | 4/2010 | Li et al. | |
| 2010/0114628 A1 | 5/2010 | Adler et al. | |
| 2010/0131857 A1 | 5/2010 | Prigge | |
| 2010/0153866 A1 | 6/2010 | Sharoni | |
| 2010/0169265 A1 | 7/2010 | Ristock et al. | |
| 2010/0225658 A1 | 9/2010 | Coleman | |
| 2010/0226441 A1 | 9/2010 | Tung et al. | |
| 2010/0231599 A1 | 9/2010 | Tung et al. | |
| 2010/0241844 A1 | 9/2010 | Hussain et al. | |
| 2010/0245563 A1 | 9/2010 | Golovchinsky et al. | |
| 2010/0250497 A1 | 9/2010 | Redlich et al. | |
| 2010/0274815 A1 | 10/2010 | Vanasco | |
| 2011/0004564 A1 | 1/2011 | Rolia et al. | |
| 2011/0029947 A1 | 2/2011 | Markovic | |
| 2011/0078708 A1 | 3/2011 | Dokovski et al. | |
| 2011/0107298 A1 | 5/2011 | Sebastian | |
| 2011/0107309 A1 | 5/2011 | Baron | |
| 2011/0107313 A1 | 5/2011 | Baron | |
| 2011/0246904 A1 | 10/2011 | Pinto et al. | |
| 2011/0276636 A1 | 11/2011 | Cheng et al. | |
| 2012/0072509 A1 | 3/2012 | Booth | |
| 2012/0075333 A1 | 3/2012 | Chen et al. | |
| 2012/0130906 A1 | 5/2012 | Klinker | |

(56) References Cited

U.S. PATENT DOCUMENTS

| | | |
|---|---|---|
| 2012/0159296 A1 | 6/2012 | Rebstock et al. |
| 2012/0310381 A1 | 12/2012 | Karaffa |
| 2012/0310875 A1 | 12/2012 | Prahlad et al. |
| 2012/0324358 A1 | 12/2012 | Jooste |
| 2012/0331527 A1 | 12/2012 | Walters et al. |
| 2013/0031158 A1 | 1/2013 | Salsburg |
| 2013/0117662 A1 | 5/2013 | Shan et al. |
| 2013/0151557 A1 | 6/2013 | Shanken et al. |
| 2013/0174028 A1 | 7/2013 | Grossman et al. |
| 2013/0177662 A1 | 7/2013 | Msika |
| 2013/0275475 A1 | 10/2013 | Ahlborn |
| 2013/0332423 A1 | 12/2013 | Puri et al. |
| 2013/0339872 A1 | 12/2013 | Shuster |
| 2014/0007186 A1 | 1/2014 | Agrawal et al. |
| 2014/0026113 A1 | 1/2014 | Farooqi |
| 2014/0032875 A1 | 1/2014 | Butler |
| 2014/0047011 A1 | 2/2014 | Lahav et al. |
| 2014/0047413 A1 | 2/2014 | Sheive et al. |
| 2014/0047556 A1 | 2/2014 | Davis |
| 2014/0075407 A1 | 3/2014 | Donis et al. |
| 2014/0089388 A1 | 3/2014 | Curry et al. |
| 2014/0114907 A1 | 4/2014 | Kozina et al. |
| 2014/0114962 A1 | 4/2014 | Rosenburg et al. |
| 2014/0207575 A1 | 7/2014 | Freed-Finnegan et al. |
| 2014/0245199 A1 | 8/2014 | Belotti et al. |
| 2014/0282453 A1 | 9/2014 | O'Rourke et al. |
| 2014/0288923 A1 | 9/2014 | Marian et al. |
| 2014/0288945 A1 | 9/2014 | Boerner et al. |
| 2014/0372591 A1* | 12/2014 | Payette ............. H04L 47/762 709/223 |
| 2014/0380105 A1 | 12/2014 | Michel et al. |
| 2015/0006543 A1 | 1/2015 | Jin et al. |
| 2015/0012478 A1 | 1/2015 | Mohammad et al. |
| 2015/0046930 A1 | 2/2015 | Phadke |
| 2015/0088933 A1 | 3/2015 | Schofield et al. |
| 2015/0127660 A1 | 5/2015 | Zilberberg et al. |
| 2015/0128105 A1 | 5/2015 | Sethi et al. |
| 2015/0248280 A1 | 9/2015 | Pillay |
| 2015/0293764 A1 | 10/2015 | Visvanathan |
| 2015/0379303 A1 | 12/2015 | LaFever et al. |
| 2016/0026968 A1 | 1/2016 | Fan et al. |
| 2016/0034260 A1 | 2/2016 | Ristock et al. |
| 2016/0034571 A1 | 2/2016 | Setayesh et al. |
| 2016/0044380 A1 | 2/2016 | Barrett |
| 2016/0070541 A1 | 3/2016 | Lee et al. |
| 2016/0112453 A1 | 4/2016 | Martinez et al. |
| 2016/0117159 A1 | 4/2016 | Balko |
| 2016/0140204 A1 | 5/2016 | Brown et al. |
| 2016/0253340 A1 | 9/2016 | Barth et al. |
| 2016/0267060 A1 | 9/2016 | Skirpa et al. |
| 2016/0267082 A1 | 9/2016 | Wong et al. |
| 2016/0275439 A1 | 9/2016 | Avats et al. |
| 2016/0283200 A1 | 9/2016 | Standley et al. |
| 2016/0299933 A1 | 10/2016 | Fillipi et al. |
| 2016/0359711 A1 | 12/2016 | Deen et al. |
| 2016/0364163 A1 | 12/2016 | Kamble |
| 2017/0034306 A1 | 2/2017 | Thangeswaran |
| 2017/0039041 A1 | 2/2017 | Bommireddi |
| 2017/0068395 A1 | 3/2017 | Massoud |
| 2017/0118284 A1 | 4/2017 | Chen et al. |
| 2017/0123751 A1 | 5/2017 | Sigurdsson et al. |
| 2017/0154026 A1 | 6/2017 | Gong et al. |
| 2017/0180284 A1 | 6/2017 | Smullen et al. |
| 2017/0199936 A1 | 7/2017 | Steelberg et al. |
| 2017/0220813 A1 | 8/2017 | Mullins et al. |
| 2017/0228119 A1 | 8/2017 | Hosbettu et al. |
| 2017/0269972 A1 | 9/2017 | Hosabettu et al. |
| 2017/0270022 A1 | 9/2017 | Moresmau et al. |
| 2017/0339564 A1 | 11/2017 | Momchilov et al. |
| 2017/0344227 A1 | 11/2017 | Stoicov et al. |
| 2017/0357814 A1 | 12/2017 | Mahaffey et al. |
| 2017/0372442 A1 | 12/2017 | Mejias |
| 2018/0089005 A1 | 3/2018 | Green |
| 2018/0121841 A1 | 5/2018 | Harris |
| 2018/0129497 A1 | 5/2018 | Biddle et al. |
| 2018/0167426 A1 | 6/2018 | Sigurdsson et al. |
| 2018/0174104 A1 | 6/2018 | Schikora et al. |
| 2018/0191761 A1 | 7/2018 | Lee et al. |
| 2018/0197123 A1 | 7/2018 | Parimelazhagan et al. |
| 2018/0322396 A1 | 11/2018 | Ahuja-Cogny et al. |
| 2018/0341573 A1 | 11/2018 | Patel |
| 2018/0367506 A1 | 12/2018 | Ford et al. |
| 2019/0081935 A1 | 3/2019 | Broussard et al. |
| 2019/0129734 A1 | 5/2019 | Yang et al. |
| 2019/0158630 A1 | 5/2019 | Aragón et al. |
| 2019/0196793 A1 | 6/2019 | Jaiprakash |
| 2019/0205111 A1 | 7/2019 | Bennet et al. |
| 2019/0205403 A1* | 7/2019 | Hussain ............ G06F 16/24564 |
| 2019/0208031 A1 | 7/2019 | Bennet et al. |
| 2019/0238467 A1 | 8/2019 | Guan et al. |
| 2019/0238688 A1 | 8/2019 | Bermundo et al. |
| 2019/0243742 A1 | 8/2019 | Natari |
| 2019/0332357 A1 | 10/2019 | Reddy |
| 2019/0342404 A1 | 11/2019 | Kundu et al. |
| 2019/0369969 A1 | 12/2019 | Donohoe et al. |
| 2020/0026735 A1 | 1/2020 | Przada |
| 2020/0042648 A1 | 2/2020 | Rao |
| 2020/0050983 A1 | 2/2020 | Balasubramanian et al. |
| 2020/0133982 A1 | 4/2020 | Thangeswaran et al. |
| 2020/0134374 A1 | 4/2020 | Oros |
| 2020/0348964 A1 | 11/2020 | Anand et al. |
| 2020/0356365 A1 | 11/2020 | Pezaris |
| 2020/0409665 A1 | 12/2020 | Swaminathan et al. |
| 2021/0004711 A1 | 1/2021 | Gupta et al. |
| 2021/0006596 A1* | 1/2021 | Beredimas ............ G06F 21/567 |
| 2021/0019574 A1 | 1/2021 | Voicu |
| 2021/0037110 A1 | 2/2021 | Bennet et al. |
| 2021/0092154 A1 | 3/2021 | Kumar et al. |
| 2021/0094176 A1 | 4/2021 | Rusanu |
| 2021/0107164 A1 | 4/2021 | Singh et al. |
| 2021/0109503 A1 | 4/2021 | Singh et al. |
| 2021/0109742 A1 | 4/2021 | Bennet et al. |
| 2021/0110345 A1 | 4/2021 | Iyer et al. |
| 2021/0117162 A1 | 4/2021 | Thangaraj et al. |
| 2021/0117210 A1 | 4/2021 | Yueh |
| 2021/0117302 A1 | 4/2021 | Kadakia et al. |
| 2021/0117394 A1 | 4/2021 | Moresmau et al. |
| 2021/0117517 A1 | 4/2021 | Bregman et al. |
| 2021/0117562 A1 | 4/2021 | Balan et al. |
| 2021/0117563 A1 | 4/2021 | Moresmau et al. |
| 2021/0117895 A1 | 4/2021 | Tondevold et al. |
| 2021/0194994 A1 | 6/2021 | Aragón et al. |
| 2021/0286597 A1 | 9/2021 | Thangaraj et al. |
| 2021/0342900 A1* | 11/2021 | Memon .................. G16H 15/00 |
| 2021/0357503 A1 | 11/2021 | Moresmau et al. |
| 2022/0060558 A1 | 2/2022 | Bennet et al. |
| 2022/0067731 A1* | 3/2022 | Palaniappan ........ G06Q 20/401 |
| 2022/0114267 A1 | 4/2022 | Schwartz et al. |
| 2022/0116787 A1 | 4/2022 | Balan et al. |

FOREIGN PATENT DOCUMENTS

| | | |
|---|---|---|
| EP | 3714604 A1 | 9/2020 |
| EP | 3732566 | 11/2020 |
| EP | 3732582 | 11/2020 |
| WO | WO2008003593 A1 | 1/2008 |
| WO | WO2013105076 A1 | 7/2013 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |

(56) References Cited

FOREIGN PATENT DOCUMENTS

| WO | WO2021076791 A1 | 4/2021 |
|---|---|---|
| WO | WO2021076921 A1 | 4/2021 |

OTHER PUBLICATIONS

"Extended European Search Report" and "Written Opinion", European Application No. 18879227.9, dated Mar. 15, 2021, 9 pages.
"Extended European Search Report" and "Written Opinion", European Application No. 18895108.1, dated Aug. 19, 2021, 8 pages.
"Extended European Search Report" and "Written Opinion", European Application No. 18895245.1, dated Aug. 25, 2021, 8 pages.
"International Search Report" and "Written Opinion of the International Searching Authority," Patent Cooperation Treaty Application No. PCT/US2021/054415, dated Jan. 19, 2022, 8 pages.
Kuligowski, Kiely; "What Is a Document Repository?" business.com. [Retrieved on Dec. 12, 2021]; <URL: https://www.business.com/articles/what-is-document-repository/>, Jun. 25, 2020, 10 pages.
"International Search Report" and "Written Opinion of the International Searching Authority," Patent Cooperation Treaty Application No. PCT/US2021/054416, dated Jan. 19, 2022, 9 pages.
"International Search Report" and "Written Opinion of the International Searching Authority," Patent Cooperation Treaty Application No. PCT/US2017/022295, dated Jun. 1, 2017, 9 pages.
"International Search Report" and "Written Opinion of the International Searching Authority," Patent Cooperation Treaty Application No. PCT/US2018/056196, dated Dec. 26, 2018, 8 pages.
"International Search Report" and "Written Opinion of the International Searching Authority," Patent Cooperation Treaty Application No. PCT/US2018/064127, dated Feb. 11, 2019, 6 pages.
"International Search Report" and "Written Opinion of the International Searching Authority," Patent Cooperation Treaty Application No. PCT/US2018/064122, dated Mar. 18, 2019, 8 pages.
"Extended European Search Report" and "Written Opinion", European Application No. 17767331.6, dated Nov. 14, 2019, 6 pages.
"International Search Report" and "Written Opinion of the International Searching Authority," Patent Cooperation Treaty Application No. PCT/US2020/037028, dated Aug. 28, 2020, 13 pages.
"International Search Report" and "Written Opinion of the International Searching Authority," Patent Cooperation Treaty Application No. PCT/US2020/053141, dated Jan. 12, 2021, 8 pages.
"International Search Report" and "Written Opinion of the International Searching Authority," Patent Cooperation Treaty Application No. PCT/US2020/053419, dated Jan. 14, 2021, 14 pages.
"International Search Report" and "Written Opinion of the International Searching Authority," Patent Cooperation Treaty Application No. PCT/US2020/053138, dated Jan. 12, 2021, 8 pages.
"International Search Report" and "Written Opinion of the International Searching Authority," Patent Cooperation Treaty Application No. PCT/US2020/053139, dated Jan. 11, 2021, 8 pages.
"International Search Report" and "Written Opinion of the International Searching Authority," Patent Cooperation Treaty Application No. PCT/US2020/056026, dated Jan. 19, 2021, 16 pages.
"International Search Report" and "Written Opinion of the International Searching Authority," Patent Cooperation Treaty Application No. PCT/US2020/055829, dated Jan. 19, 2021, 18 pages.
"International Search Report" and "Written Opinion of the International Searching Authority," Patent Cooperation Treaty Application No. PCT/US2020/055418, dated Jan. 28, 2021, 8 pages.
"International Search Report" and "Written Opinion of the International Searching Authority," Patent Cooperation Treaty Application No. PCT/US2020/055420, dated Feb. 1, 2021, 8 pages.
Choudhri et al., "PatientService: Electronic Patient Record Redaction and Delivery in Pervasive Environments." Proceedings 5th International Workshop on Enterprise Networking and Computing in Healthcare Industry (HealthCom), IEEE, Jul. 2003, 7 pages.
Romao et al., "Robotic Process Automation: A Case Study in the Banking Industry," 2019 14th Iberian Conference on Information Systems and Technologies, Jun. 19-22, 2019, 6 pages.

* cited by examiner

| ASG | 🔍 Search for people, applications, documents and more... | Username ⓘ ▼ | Log out |
|---|---|---|---|
| | | Default Context | |

Home > Settings > Policy groups > Access control

Access Control ↗ ✕

⬚ Import  ⎙ Export

⊕ Add Rule  ⇄ Test  💾 Save  ↻ Reload                    ⏱ ✕

Name

| | | | | | | | Showing all of 1200 |
|---|---|---|---|---|---|---|---|
| | Sk ▤ Description | Reports | Redacted | Users assigned to | View | Print | Download | Access |
| Reports | 01 Marketing departmental access | Marketing Material | ⊘ | ᗉᗉ Marketing | ⊘ | ⊘ | ⊘ | ⊗ |
| Topics | 02 Sales department Access | Sales Projection | ⊘ | ᗉᗉ Sales | ⊘ | ⊘ | ⊘ | ⊗ |
| Administrative Functions | 03 Accounting access | Accounting Content | ⊘ | ᗉᗉ Accounting | ⊘ | ⊘ | ⊘ | ⊗ |
| | 04 Only for HR Manager | Executive Compensation | ⊘ | ᗉᗉ HR Manager | ⊘ | ⊘ | ⊘ | ⊗ |
| | 05 Marketing departmental access | HR Records | ⊘ | ᗉᗉ HR | ⊘ | ⊘ | ⊘ | ⊗ |
| | 06 Only view access for HR... | HR Records | ⊘ | ᗉᗉ HR | ⊘ | ⊘ | ⊘ | ⊗ |
| | 07 HR department access | HR Records | ⊘ | ᗉᗉ HR, Joe Dow, +2 | ⊘ | ⊘ | ⊘ | ⊗ |
| | 08 HR department access | HR Records | ⊘ | ᗉᗉ HR, Joe Dow, +2 | ⊘ | ⊘ | ⊘ | ⊗ |
| | 09 HR department access | HR Records | ⊘ | ᗉᗉ HR, Joe Dow, +2 | ⊘ | ⊘ | ⊘ | ⊗ |
| | 10 HR department access | HR Records | ⊘ | ᗉᗉ HR, Joe Dow, +2 | ⊘ | ⊘ | ⊘ | ⊗ |
| | 11 HR department access | HR Records | ⊘ | ᗉᗉ HR, Joe Dow, +2 | ⊘ | ⊘ | ⊘ | ⊗ |

| ASG | | Search for people, applications, documents and more... | | | Username Default Context ▾ | | Log out |
|---|---|---|---|---|---|---|---|
| Home > Settings > Policy groups > Access control > Reports | | | | | | | |
| Reports | | | | | | | ↗ ✕ |
| *This is the description of the table* *Hit Policy: Unique* *Description of Unique* | | | | | 2 Selected \| Clear Selection | | |
| # | Description | Reports | Redacted | Users assigned to | View | Print | Download | Access |
| 01 | Marketing departmental access | Marketing Material | ⊘ | ᎪᎪ Marketing | ⊘ | ⊘ | ⊘ | ⊗ |
| 02 | Sales department Access | Sales Projection | ⊘ | ᎪᎪ Sales | ⊘ | ⊘ | ⊘ | ⊗ |
| 03 | Accounting access | Accounting Content | ⊘ | ᎪᎪ Accounting | ⊘ | ⊘ | ⊘ | ⊗ |
| 04 | Only for HR Manager | Executive Compensation | ⊘ | ᎪᎪ HR Manager | ⊘ | ⊘ | ⊘ | ⊗ |
| 05 | Marketing departmental access | HR Records | ⊘ | ᎪᎪ HR | ⊘ | ⊘ | ⊘ | ⊗ |
| 06 | Only view access for HR... | HR Records | ⊘ | ᎪᎪ HR | ⊘ | ⊘ | ⊘ | ⊗ |
| 07 | HR department access | HR Records | ⊘ | ᎪᎪ HR, Joe Dow, +2 | ⊘ | ⊘ | ⊘ | ⊗ |
| 08 | HR department access | HR Records | ⊘ | ᎪᎪ HR, Joe Dow, +2 | ⊘ | ⊘ | ⊘ | ⊗ |
| 09 | HR department access | HR Records | ⊘ | ᎪᎪ HR, Joe Dow, +2 | ⊘ | ⊘ | ⊘ | ⊗ |
| 10 | HR department access | HR Records | ⊘ | ᎪᎪ HR, Joe Dow, +2 | ⊘ | ⊘ | ⊘ | ⊗ |
| 11 | HR department access | HR Records | ⊘ | ᎪᎪ HR, Joe Dow, +2 | ⊘ | ⊘ | ⊘ | ⊗ |

FIG. 8

| | ASG | 🔍 Search for people, applications, documents and more... | | | | Username Default Context 👤 ▼ | Log out |
|---|---|---|---|---|---|---|---|
| | Home > Settings > Policy groups > Access control > Reports | | | | | | |
| | Reports ⓘ | | | 2 rules deleted successfully | | Undo \| Close | ↖ ✕ |
| | ⊕ Add Rule ⇵ Test 💾 Save ↻ Reload | | | | | | |
| | ⁺ Add a filter | | | | | | Showing all of 1200 |
| | # Description | Reports | ✎ | Redacted | Users assigned to | View Print Download | Access |
| 01 | Marketing departmental access | Marketing Material | | ⊘ | ⨭ Marketing | ⊘ ⊘ ⊘ | ⊗ |
| 02 | Sales department Access | Sales Projection | | ⊘ | ⨭ Sales | ⊘ ⊘ ⊘ | ⊗ |
| 03 | Accounting access | Accounting Content | | ⊘ | ⨭ Accounting | ⊘ ⊘ ⊘ | ⊗ |
| 04 | Only for HR Manager | Executive Compensation | | ⊘ | ⨭ HR Manager | ⊘ ⊘ ⊘ | ⊗ |
| 05 | Marketing departmental access | HR Records | | ⊘ | ⨭ HR | ⊘ ⊘ ⊘ | ⊗ |
| 06 | Only view access for HR... | HR Records | | ⊘ | ⨭ HR | ⊘ ⊘ ⊘ | ⊗ |
| 07 | HR department access | HR Records | | ⊘ | ⨭ HR, Joe Dow ,+2 | ⊘ ⊘ ⊘ | ⊗ |
| 08 | HR department access | HR Records | | ⊘ | ⨭ HR, Joe Dow ,+2 | ⊘ ⊘ ⊘ | ⊗ |
| 09 | HR department access | HR Records | | ⊘ | ⨭ HR, Joe Dow ,+2 | ⊘ ⊘ ⊘ | ⊗ |
| 10 | HR department access | HR Records | | ⊘ | ⨭ HR, Joe Dow ,+2 | ⊘ ⊘ ⊘ | ⊗ |
| 11 | HR department access | HR Records | | ⊘ | ⨭ HR, Joe Dow ,+2 | ⊘ ⊘ ⊘ | ⊗ |

| | ASG | | Search for people, applications, documents and more... | | | Username ⓘ ▼ Default Context | Log out |
|---|---|---|---|---|---|---|---|

Home > Settings > Policy groups > Access control

Reports ⓘ

⊕ Add Rule ⇅ Test 💾 Save ↻ Reload

⌈ + Add a filter ⌉

| # | Description | Reports | Redacted | Users assigned to |
|---|---|---|---|---|
| 01 | Marketing departmental access | Marketing Material | ⊘ | ዶዶ Marketing |
| 02 | Sales department Access | Sales Projection | ⊘ | ዶዶ Sales |
| 03 | Accounting access | Accounting Content | ⊘ | ዶዶ Accounting |
| 04 | Only for HR Manager | Executive Compensation | ⊘ | ዶዶ HR Manager |
| 05 | Marketing departmental access | HR Records | ⊘ | ዶዶ HR |
| 06 | Only view access for HR... | HR Records | ⊘ | ዶዶ HR |
| 07 | HR department access | HR Records | ⊘ | ዶዶ HR, Joe Dow ,+2 |
| 08 | HR department access | HR Records | ⊘ | ዶዶ HR, Joe Dow ,+2 |
| 09 | HR department access | HR Records | ⊘ | ዶዶ HR, Joe Dow ,+2 |
| 10 | HR department access | HR Records | ⊘ | ዶዶ HR, Joe Dow ,+2 |
| 11 | HR department access | HR Records | ⊘ | ዶዶ HR, Joe Dow ,+2 |

Rule Details ↑ ↓ ✕

Description
[ Marketing department access ]

Input
Reports
[ Marketing Material ]
Redacted ● NO
Users assigned to
[ ዶዶ Marketing ]

Operations
☑ View

Output
☑ Print  ☐ Download
Access ( YES ● )

| ASG | | 🔍 Search for people, applications, documents and more... | | | Username<br>Default Context ⓘ ▼ | | | Log out |
|---|---|---|---|---|---|---|---|---|
| Home > Settings > Policy groups > Access control > Reports | | | | | | | | ↙ ✕ |
| Reports ⓘ | | | | | | | | |
| ⊕ Add Rule ↻ Test 💾 Save ↺ Reload | | | | | | | | |
| ( + Add a filter ) | | | | | | | Showing all of 1200 | |
| | # | Description | Reports | Redacted | Users assigned to | View | Print | Download | Access |
| | 01 | Marketing departmental access | Marketing Material | ⓧ | ᴀᴀ Marketing | ⓧ | ⓧ | ⓧ | ⓧ |
| | 02 | Sales department Access | Sales Projection | ⓧ | ᴀᴀ Sales | ⓧ | ⓧ | ⓧ | ⓧ |
| | 03 | Accounting access | Accounting Content | ⓧ | ᴀᴀ Accounting | ⓧ | ⓧ | ⓧ | ⓧ |
| | 04 | Only for HR Manager | Executive Compensation | ⓧ | ᴀᴀ HR Manager | ⓧ | ⓧ | ⓧ | ⓧ |
| | 05 | Marketing departmental access | HR Records | ⓧ | ᴀᴀ HR | ⓧ | ⓧ | ⓧ | ⓧ |
| | 06 | Only view access for HR... | HR Records | ⓧ | ᴀᴀ HR | ⓧ | ⓧ | ⓧ | ⓧ |
| | 07 | HR department access | HR Records | ⓧ | ᴀᴀ HR, Joe Dow ,+2 | ⓧ | ⓧ | ⓧ | ⓧ |
| | 08 | HR department access | HR Records | ⓧ | ᴀᴀ HR, Joe Dow ,+2 | ⓧ | ⓧ | ⓧ | ⓧ |
| | 09 | HR department access | HR Records | ⓧ | ᴀᴀ HR, Joe Dow ,+2 | ⓧ | ⓧ | ⓧ | ⓧ |
| | 10 | HR department access | HR Records | ⓧ | ᴀᴀ HR, Joe Dow ,+2 | ⓧ | ⓧ | ⓧ | ⓧ |
| | 11 | HR department access | HR Records | ⓧ | ᴀᴀ HR, Joe Dow ,+2 | ⓧ | ⓧ | ⓧ | ⓧ |
| | 12 | HR department access | HR Records | ⓧ | ᴀᴀ HR, Joe Dow ,+2 | ⓧ | ⓧ | ⓧ | ⓧ |

| ASG | Search for people, applications, documents and more... | | | | Username ⓘ ▾ | Log out |
|---|---|---|---|---|---|---|
| | | | | | Default Context | |

Home > Policies > Content > Access control > Create

Access Control  Hit Policy: Unique ⓘ

This is the description of access control table

⊕ Add Rule  ↕ Test

| | | | | | | Add Rule ✕ |
|---|---|---|---|---|---|---|
| ⊕ Add a filter | | | | | | ↕ Test |
| Description | Document Name | Users assigned to | Column 1 | Column 2 | Column 3 | Document Name |
| Marketing departmental access | Marketing Material | 👥 Marketing | Column 1 | Column 2 | Column 3 | Marketing Material |
| Sales department Access | Sales Projection | 👥 Sales | Column 1 | Column 2 | Column 3 | Description |
| Accounting access | Accounting Content | 👥 Accounting | Column 1 | Column 2 | Column 3 | |
| Only for HR Manager | Executive Compensation | 👥 HR Manager | Column 1 | Column 2 | Column 3 | |
| Marketing departmental access | HR Records | 👥 HR | Column 1 | Column 2 | Column 3 | Assign User(s) / Group(s) |
| Only view access for HR... | HR Records | 👥 HR | Column 1 | Column 2 | Column 3 | Type the name of the user or group to add |
| HR department access | HR Records | 👥 HR, Joe Dow, +2 | Column 1 | Column 2 | Column 3 | |
| HR department access | HR Records | 👥 HR, Joe Dow, +2 | Column 1 | Column 2 | Column 3 | Allowed Operations |
| HR department access | HR Records | 👥 HR, Joe Dow, +2 | Column 1 | Column 2 | Column 3 | ☑ View  ☑ Print  ☑ Download |
| HR department access | HR Records | 👥 HR, Joe Dow, +2 | Column 1 | Column 2 | Column 3 | ☐ Redaction |
| HR department access | HR Records | 👥 HR, Joe Dow, +2 | Column 1 | Column 2 | Column 3 | ☑ View Access |
| | | | | | | Note: Need to check the capability to use Form Designer |
| | | | | | | SAVE |

FIG. 14

| ASG Policy Administration | | | |
|---|---|---|---|
| Enforcement Point: | createAnnotation ▸ | | |
| Description: | Decision table models for creating an annotation | | |
| ☑ Enabled | | | |
| Matching: | Unique ▸ | | |

| # | Field | Description | Active | Protection |
|---|---|---|---|---|
| 1 | Type | The type of annotation | ☑ | 🗎 |
| 2 | Document ID | The Id of a document | ☑ | 🗎 |
| 3 | Document Size | The size, in bytes, of the document | ☐ | |
| 4 | Repository Type | The type of repository holding the content | ☐ | |
| 5 | User Info | The User Information | ☑ | 🗎 |
| 6 | Webhook | The web hook to call | ☑ | 🗎 |
| 7 | Allowed | If the processing should continue | ☑ | 🗎 |

Cancel   Save

FIG. 15

SYSTEMS AND METHODS FOR SECURE POLICIES-BASED INFORMATION GOVERNANCE

CROSS REFERENCE TO RELATED APPLICATION

This application claims the priority benefit of U.S. Provisional Patent Application Ser. No. 62/923,381 filed on Oct. 18, 2019, which is hereby incorporated by reference in its entirety including all references cited therein.

FIELD OF THE TECHNOLOGY

Embodiments of the disclosure relate to information governance. In particular, the present disclosure relates to systems and methods for secure policies-based information governance.

SUMMARY OF THE INVENTION

In some embodiments, the present disclosure is directed to a system of one or more computers which can be configured to perform particular operations or actions by virtue of having software, firmware, hardware, or a combination thereof installed on the system that in operation causes or cause the system to perform actions and/or method steps as described herein.

Embodiments of the present technology are directed to systems and methods for secure policies-based information governance. An exemplary method includes: displaying a Graphical User Interface (GUI), the graphical user interface receiving a business rule input from a business user; receiving a policy from a policy engine based on the business rule input, the policy engine generating a policy hierarchy; defining a plurality of domain objects and a plurality of domain object representations in the Graphical User Interface (GUI) based on the policy and the policy hierarchy; defining an extensible hierarchical domain model definition using the policy hierarchy, the extensible hierarchical domain model definition being modified using the plurality of domain object representations in the Graphical User Interface (GUI); defining a Policy Enforcement Point (PEP) in an application based on the extensible hierarchical domain model definition; providing a mapping from the Policy Enforcement Point (PEP) in the application to the plurality of domain object representations in the Graphical User Interface (GUI); receiving, by the Policy Enforcement Point (PEP), a user request to access a resource on the application, the user request comprising attributes of the user; sending, by the Policy Enforcement Point (PEP), the user request to access the resource on the application to a Policy Decision Point (PDP); evaluating, by the Policy Decision Point (PDP), the user request to access the resource on the application, the evaluating using the extensible hierarchical domain model definition; generating, by the Policy Decision Point (PDP), a decision regarding the user request to access the resource on the application based on the evaluating; and enforcing, by the Policy Enforcement Point (PEP), the decision regarding the user request to access the resource on the application.

In various embodiments the evaluating, by the Policy Decision Point (PDP), the user request to access the resource further comprises: sending, by the Policy Decision Point (PDP), an attribute evaluation request regarding the attributes of the user to a Policy Information Point (PIP); evaluating, using the Policy Information Point (PIP), the attributes of the user, the evaluating using the extensible hierarchical domain model definition; and replying, by the Policy Information Point (PIP), to the attribute evaluation request based on the evaluating, using the Policy Information Point (PIP), of the attributes of the user.

In some embodiments the evaluating, using the Policy Information Point (PIP), the attributes of the user comprises using at least one of a decision model template, a decision table template, and a domain.

In various embodiments the evaluating, using the Policy Information Point (PIP), the attributes of the user comprises using the decision table template, the decision table template comprising: information for presenting the decision table template to the business user using the Graphical User Interface (GUI); attributes of the plurality of domain objects; and formatting of the attributes of the plurality of domain objects for displaying on the Graphical User Interface (GUI).

Various embodiments further include generating a custom domain model, wherein the evaluating, using the Policy Information Point (PIP), the attributes of the user comprises using the custom domain model.

In various embodiments the graphical user interface further comprises a policy designer screen for the business user, the policy designer screen receiving a disable policy enforcement point input, the disable policy enforcement point input disabling the Policy Enforcement Point (PEP) preventing the Policy Enforcement Point (PEP) from enforcing the policy.

In various embodiments the graphical user interface further comprises a policy designer screen for the business user, the policy designer screen receiving an enable policy enforcement point input, the enable policy enforcement point input enabling the Policy Enforcement Point (PEP) allowing the Policy Enforcement Point (PEP) to enforce the policy.

In some embodiments the decision regarding the user request to access the resource on the application is to deny access to the resource based on the policy; and the enforcing, by the Policy Enforcement Point (PEP), the decision regarding the user request to access the resource is denying access to the resource on the application.

In some embodiments the decision regarding the user request to access the resource on the application is to grant access to the resource based on the policy; and the enforcing, by the Policy Enforcement Point (PEP), the decision regarding the user request to access the resource on the application is granting access to the resource on the application.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 6 illustrates a Graphical User Interface (GUI) (e.g., Graphical User Interface (GUI) 150) showing a subject heading of policy groups, sub-heading access control of reports including a table of policies comprising a policy hierarchy for secure policies-based information governance, in accordance with various embodiments of the present technology.

FIG. 7 illustrates a Graphical User Interface (GUI) showing two selected business rules of a table of business rules comprising a policy hierarchy for secure policies-based information governance, after a user selects the subject heading of policy groups, sub-heading access control of reports of FIG. 6, in accordance with various embodiments of the present technology.

FIG. 8 illustrates a Graphical User Interface (GUI) (e.g., Graphical User Interface (GUI) 150) showing two selected policies including a description of a table of policies comprising a policy hierarchy and a policy description for secure policies-based information governance, in accordance with various embodiments of the present technology.

FIG. 9 illustrates a Graphical User Interface (GUI) (e.g., Graphical User Interface (GUI) 150) showing two business rules of a table of policies comprising a policy hierarchy have been deleted successfully for secure policies-based information governance in accordance with various embodiments of the present technology.

FIG. 10 illustrates a Graphical User Interface (GUI) showing adding a business rule to a table of policies comprising a policy hierarchy for secure policies-based information governance in accordance with various embodiments of the present technology.

FIG. 11 illustrates a Graphical User Interface (GUI) showing adding access controls to the business rule for secure policies-based information governance in accordance with various embodiments of the present technology.

FIG. 12 illustrates a Graphical User Interface (GUI) showing adding policy hierarchy data to a policy of a table of policies comprising a policy hierarchy for secure policies-based information governance in accordance with various embodiments of the present technology.

FIG. 13 illustrates a Graphical User Interface (GUI) shows the enabling of a user to test a business rule input for secure policies-based information governance in accordance with various embodiments of the present technology.

FIG. 14 illustrates a Graphical User Interface (GUI) (e.g., Graphical User Interface (GUI) 150) showing the enabling of a user to save a business rule after testing for secure policies-based information governance in accordance with various embodiments of the present technology.

FIG. 15 illustrates a Graphical User Interface (GUI) showing a policy designer screen including hierarchy data to a policy for secure policies-based information governance in accordance with various embodiments of the present technology.

DETAILED DESCRIPTION

Figure 1:
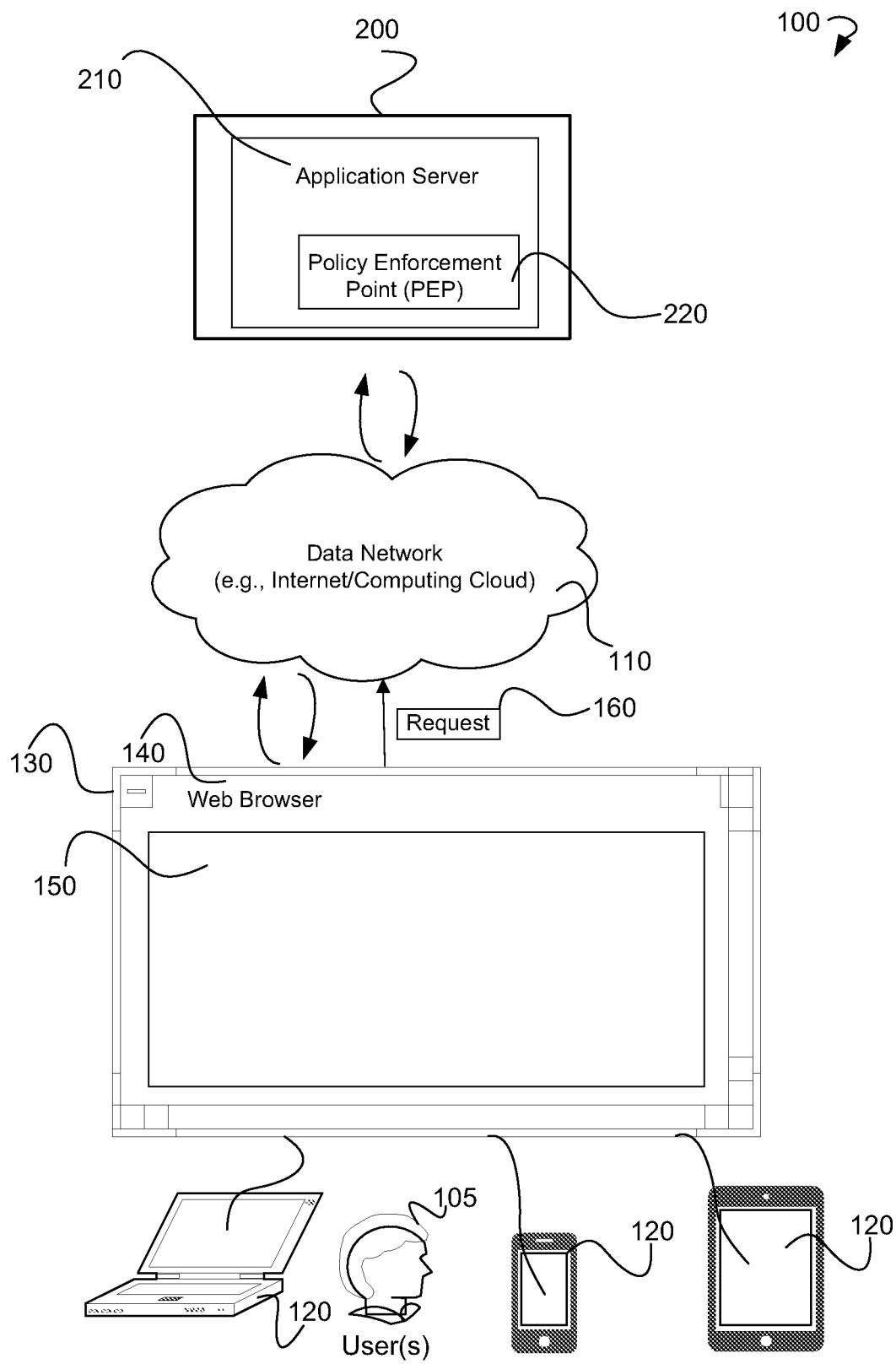
FIG. 1 illustrates an environment within which methods and systems for secure policies-based information governance may be practiced, according to exemplary embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

Business applications and processes are intended to enforce the policies of the business they serve. These definitions are often implicit, deeply embedded in applications and require specialized knowledge to change. This makes it expensive and time consuming to adapt digital enforced policies to the changing needs of the enterprise. A traditional response to this is to adopt business rules but these suffer from the same flaws, requiring specialized knowledge to change and over time result the business rules themselves evolve into complex and brittle repositories that are hard to maintain. Embodiments of the present technology enable modern, transparent and extensible systems and methods that improve the speed, costs, and ubiquity of policy definition, access, and enforcement.

Embodiments of the present technology externalize the behavior of applications and processes into policies that are designed in a business user friendly Graphical User Interface (GUI). A policy may be defined as a set of rules. For example, a security policy designates security controls of an organization, without specifying technologies, as well as offering directives on acceptable and unacceptable actions to protect critical assets. Policy operation may be defined as actions on a domain model that represents the application and objects of the application. Policy application is made ubiquitous by automatic invocation of policy enforcement at all application interfaces, while retaining the ability to reuse policy objects in additional ad-hoc Policy Enforcement Points (PEPs) as warranted by the needs of the business. A Policy Enforcement Point (PEP) is a piece of network or security equipment that controls user access to a resource on an application and ensures an authorization decision made by a Policy Decision Point (PDP) is enforced. For example, a decision model may identify a decision tables whose rules are applied at a Policy Enforcement Point (PEP).

In some network access protection implementations, the PDP is a wired switch or wireless access point, and the like. In some instances, the PDP is a firewall, intrusion prevention system (IPS), server, or inline appliance. Depending on the implementation, the PEP and PDP can either be standalone devices or consolidated into a single device.

In various embodiments of the present technology, policies are a reusable encapsulation of the decision-making process. Policies may be defined using a policy specification language, which may be specified with interfaces that allow varying tradeoffs between complexity, power, and ease of use for users (e.g., business users). For example, simple visual design Graphical User Interfaces (GUIs), allow business users to define or customize policies without knowing details of the policy definition language. More complex GUIs may be used by technical savvy users to define policies that require precise knowledge of the policy language specification. All policies regardless of how they are defined, may be used for enforcement in any number of contexts including application interfaces, User Interface (UI) elements, and business processes, allowing a business user to define or modify a policy and have the policy apply ubiquitously on all applicable Policy Enforcement Points (PEPs), permitting scalable governance, and rapid response to changing business needs.

In some embodiments of the present technology, policies may take into consideration factors both intrinsic to the applications in question (e.g., the operation being requested, and the identity of the user requesting the operation) as well as broad general criteria external to the particular Policy Enforcement Point (PEP) (e.g., the current value of the company stock price). Policies are designed by specifying the interactions between the various factors and the resulting outcome. The collection of factors considered in the operation of a policy is the domain model of the application. Domain models provide a consistent and reusable definition of application attributes that can be reused across multiple policies and Policy Enforcement Points (PEPs). Defining domain models consistently across multiple applications is a significant challenge in policy application. This problem is solved by embodiments of the present technology by defining an extensible hierarchical domain model definition that may be modified by simple configuration. Thus, defining an extensible hierarchical domain model definition that may be modified by simple configuration permits an ecosystem where multiple co-operating applications and partners can collaborate to deliver a comprehensive domain model that can be used in policy making allowing rapid iteration of policies to deal with changing business requirements by non-technical personnel without specialized knowledge. A comprehensive versioning mechanism allows multiple versions of a policy and domain model to co-exist allowing for an ordered transition between evolving business requirements.

Various embodiments of the present technology enable ubiquitous deployment of policy across all applicable Policy Enforcement Points (PEPs) necessitating strong access controls to allow varying degrees of flexibility and authority at different levels of an organization. The policy engine introduces the concept of policy hierarchy that allows precedence of policies operation. The policy hierarchy allows the concept of "Guardrails" to ensure that potentially dangerous policy actions may be controlled. For example, policies governing discounts in a grocery store need to be controlled for minimum profitability. Store managers (e.g., a business user) may have authority to develop new discount policies, but the new discount policies are in turn governed by policies created by the corporate office to ensure minimum profitability levels. Similarly, controlled access permits a department user in the store to only change the quantities a discount applies to without creating new rules allowing for ubiquitous deployment and customization of policies in conjunction with strong governance. Automatic enforcement of policies plays a strong role in establishing a strong governance model. In contrast, complex invocation and enforcement mechanics are barriers to establishing a strong governance model. In embodiments of the present technology invocation of policies at specified Policy Enforcement Points (PEPs) automatic and simple.

In some embodiments of the present technology, a user experience design (UX) for policy definition and customization is reusable in several contexts both within other applications as well as a standalone application. The reusability of the user experience design allows for holistic views of a policy allowing the policy to appear both in the relevant context that the policy is used as well as a collection of all policies including the policy hierarchy for cross cutting concerns. For example, a print policy may appear in the context of the print dialog of the applications that the print policy applies to as well as in a comprehensive list of policies as part of an administrative context. The policy hierarchy is especially important in the context of a single visual design environment allowing the design of applications, processes, and policies from a single visual canvas. For example, ASG Studio, and the like. This exemplary low code view of the application, the processes governed by the application, and the policies that apply to both, presents a single cohesive picture of the application and behavior of the application allowing a non-technical user (e.g., business user) to understand and rapidly adjust behaviors of the application without specialized technical knowledge.

Referring now to the drawings, FIG. 1 illustrates an environment 100 within which methods and systems for secure policies-based information governance may be practiced, according to exemplary embodiments of the present technology. FIG. 1 illustrates the environment 100 within which systems and methods for methods for the secure policies-based information governance may be implemented. The environment 100 may include a data network 110 (e.g., an Internet or a computing cloud), user(s) 105, client device(s) 120 associated with the user(s) 105, and a system 200 for secure policies-based information governance using a Policy Enforcement Point (PEP) 220. The Policy Enforcement Point (PEP) 220 is a logical place in an application where a decision model will be executed and an action to be taken. A Policy Enforcement Point (PEP) (e.g., Policy Enforcement Point (PEP) 220) can be anywhere within an application. In some instances, a Policy Enforcement Point (PEP) is applicable to more than one place in an application. In some embodiments, a single Policy Enforcement Point (PEP) is adhered to by more than one application.

In some embodiments user(s) 105 may comprise business users who typically are not technical people (e.g., a business user, and the like). The user(s) 105 may comprise a policy designer user (e.g., a policy designer) may design policies and enable or disable all rules on a particular Policy Enforcement Point (PEP). The user(s) 105 may comprise IT developers (e.g., a developer) to define Policy Enforcement Points (PEP) and Policy Information Points (PIP). For example, a developer may define Policy Enforcement Points (PEPs) (e.g., Policy Enforcement Point (PEP) 220) and make a policy service aware of the Policy Enforcement Points (PEPs). The IT developers (e.g., a developer) are individuals that build and create software applications, and are proficient in one or more coding languages e.g., a developer). Client device(s) 120 may comprise a personal computer (PC), a desktop computer, a laptop, a smartphone, a tablet, or so forth.

In various embodiments the system 200 may include an application server 210 and a Policy Enforcement Point (PEP) 220. The client device(s) 120 may have a Graphical User Interface (GUI) 150. Furthermore, a web browser 140 may be running on the client device(s) 120 and may be displaying a user interface 130 including the Graphical User Interface (GUI) 150. For example, Graphical User Interface (GUI) 150 may a GUI receiving a business rule input or a policy designer interface. The web browser 140 may communicate with the application server 210 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34b is analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may display a web page associated with the Graphical user Interface (GUI) 150 where user(s) 105 including a business user may define one or more policies and have the one or more policies adhered to by applications using one or more Policy Enforcement Points (PEPs) (Policy Enforcement Point 220). The web browser 140 may establish a communication channel with the application server 210 and may generate and render virtual screens based on data received from the application server 210.

The user(s) 105 may send a request 160 to the system 200 using the client device(s) 120. The request 160 may include a request to deploy a component to an application. In response to the request 160, the application server 210 may load the component to the application. The application and the component may be rendered by the web browser 140.

Figure 2:
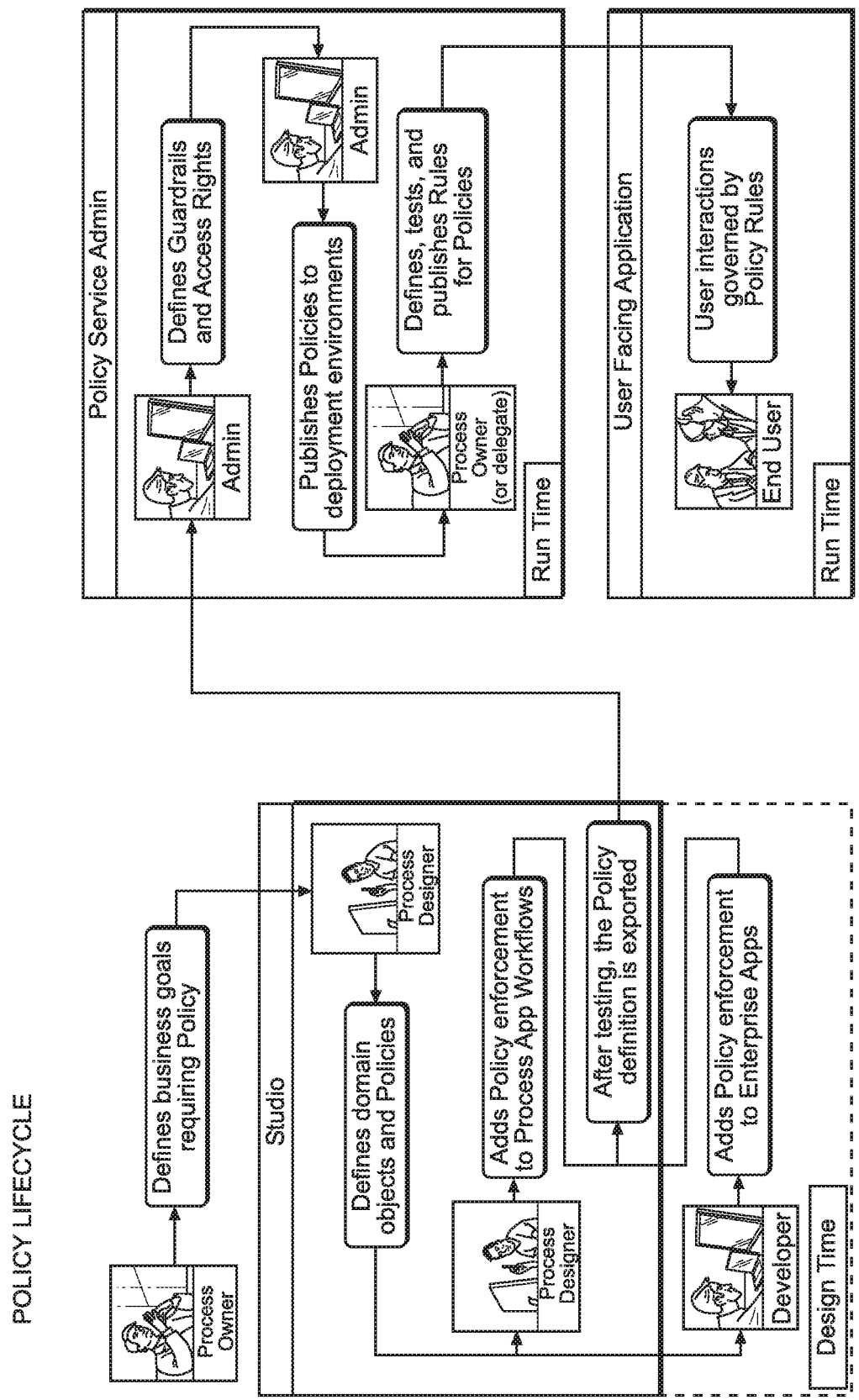
FIG. 2 illustrates a pictorial diagram of a policy lifecycle for secure policies-based information governance, according to exemplary embodiments of the present technology.

FIG. 2 illustrates a pictorial diagram of a policy lifecycle for secure policies-based information governance, according to exemplary embodiments of the present technology. The diagram of a policy lifecycle includes a studio, policy service administration, and user facing application.

The present technology enables a user (e.g., a business user) to define one or more policies and have the one or more policies adhered to by applications using one or more Policy Enforcement Points (PEPs). An application may be any program or group of programs designed for end users. The present technology includes a Graphical User Interface (GUI) (e.g., Graphical User Interface (GUI) 150) for a user (e.g., business user) to define one or more policies. For instance, a user (e.g., a business user) may enable or disable a policy using the Graphical User Interface (GUI) (e.g., Graphical User Interface (GUI) 150). In some instances, a user may enter examples to test the system to determine if expected results happen. Furthermore, the user (e.g., business user) may make the policy active or inactive for a defined period of time, or make the policy take effect on a particular date using the Graphical User Interface (GUI) (e.g., Graphical User Interface (GUI) 150). Moreover, the user (e.g., business user) can view the audit trail of changes to the one or more policies.

The present technology enables a user (e.g., a policy designer) to enable or disable all rules on a particular Policy Enforcement Point (PEP). In contrast, a business user may only define rules on enabled Policy Enforcement Points (PEPs). A user (e.g., a policy designer) may hide or show some parts of the domain model from another user (e.g., the business user), so their rules are not cumbersome. In some instances, the user (e.g., a policy designer) may move column ordering. In some embodiments a user (e.g., a policy designer) may define "guard-rails" on returned data to ensure that the returned data makes logical sense. Furthermore, defining "guard-rails" by the user (e.g., a policy designer) may prevent a user (e.g., the business user) from entering erroneous data.

The present technology enables a user (e.g., a developer) to define Policy Enforcement Points (PEP) and Policy Information Points (PIP). An exemplary Policy Information Point (PIP) is a decision table template and a domain model. In some instances, a user (e.g., a developer) may rely on common domain models for a decision table template. In other instances, a user (e.g., a developer) may create one or more custom domain models. Furthermore, a user (e.g., a developer) may call the Policy Enforcement Point (PEP) from a developer application resulting in the call of the Policy Enforcement Point (PEP) informing the developer application of the appropriate action based on the policy.

Figure 3:
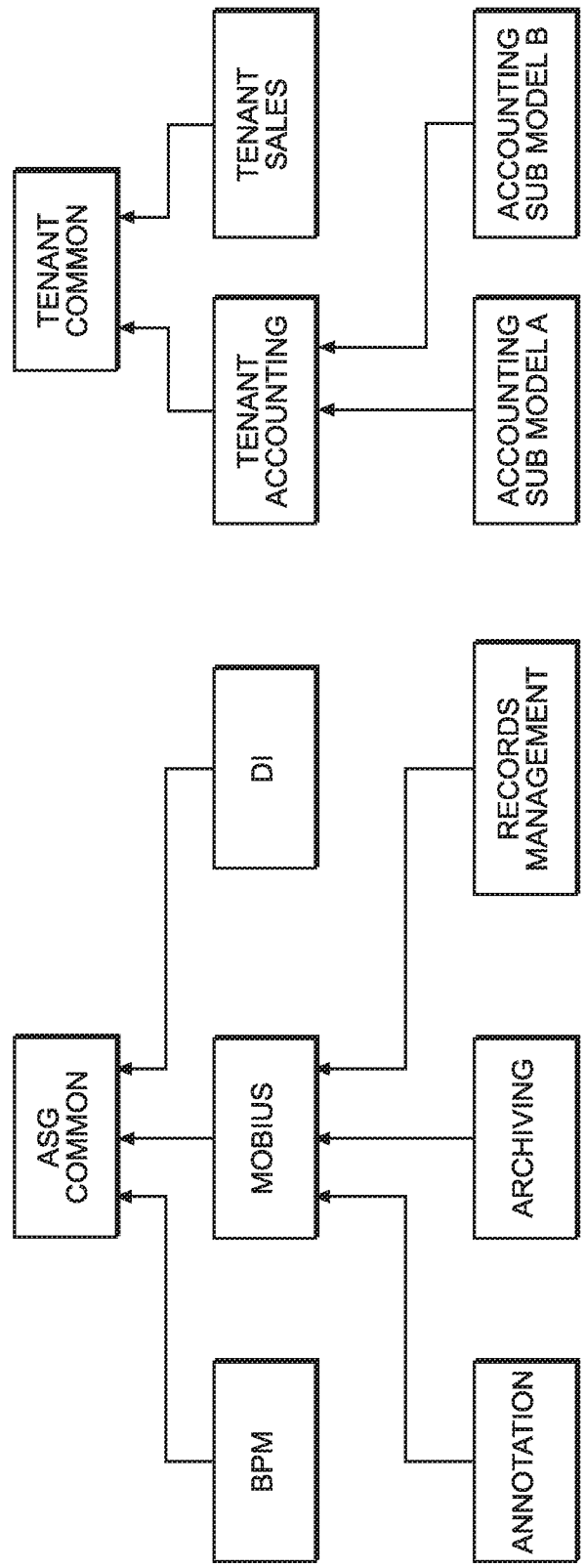
FIG. 3 illustrates another pictorial diagram of an extensible hierarchical domain model for secure policies-based information governance, according to exemplary embodiments of the present technology.

FIG. 3 illustrates another pictorial diagram of an extensible hierarchical domain model for secure policies-based information governance, according to exemplary embodiments of the present technology. The present technology enables a user (e.g., a policy designer) to enable or disable all rules on a particular Policy Enforcement Point (PEP). FIG. 3 shows the role of a user (e.g., a policy designer). For example, a policy designer may define a plurality of domain objects and a plurality of domain object representations in the Graphical User Interface (GUI) (e.g., Graphical User Interface (GUI) 150) based on the policy and the policy hierarchy. Furthermore, a policy designer may define an extensible hierarchical domain model definition using the policy hierarchy, the extensible hierarchical domain model definition being modified using the plurality of domain object representations in the Graphical User Interface (GUI) (e.g., Graphical User Interface (GUI) 150). In some instances, a user (e.g., a policy designer) may generate a custom domain model and the evaluating, using the Policy Information Point (PIP), the attributes of the user comprises using the custom domain model. In various instances, the evaluating, by the Policy Decision Point (PDP), the user request to access the resource further comprises: sending, by the Policy Decision Point (PDP), an attribute evaluation request regarding the attributes of the user to a Policy Information Point (PIP); evaluating, using the Policy Information Point (PIP), the attributes of the user, the evaluating using the extensible hierarchical domain model definition; and replying, by the Policy Information Point (PIP), to the attribute evaluation request based on the evaluating, using the Policy Information Point (PIP), of the attributes of the user. For example, the evaluating, using the Policy Information Point (PIP), the attributes of the user may comprise using at least one of a decision model template, a decision table template, and a domain. In various instances, the evaluating, using the Policy Information Point (PIP), the attributes of the user comprises using the decision table template, the decision table template comprising: information for presenting the decision table template to the business user using the Graphical User Interface (GUI); attributes of the plurality of domain objects; and formatting of the attributes of the plurality of domain objects for displaying on the Graphical User Interface (GUI).

Figure 4:
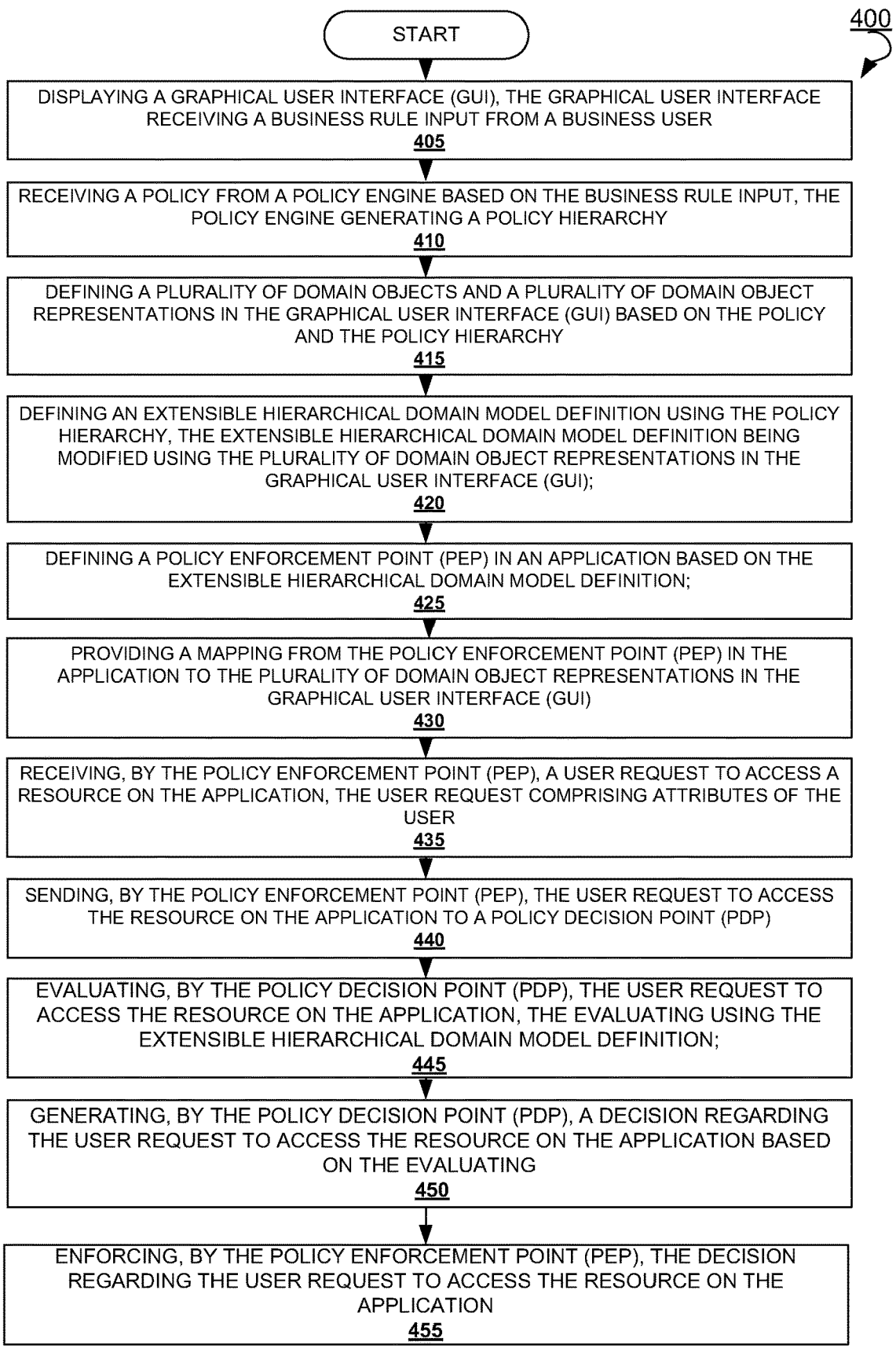
FIG. 4 illustrates process flow diagram showing a method for secure policies-based information governance, in accordance with various embodiments of the present technology.

FIG. 4 illustrates process flow diagram showing a method for secure policies-based information governance, in accordance with various embodiments of the present technology. FIG. 4 is a process flow diagram showing a method 400 for secure policies-based information governance according to one or more example embodiments. The method 400 may be performed by processing logic that may comprise hardware (e.g., dedicated logic, programmable logic, and microcode), software (such as software run on a general-purpose computer system or a dedicated machine), or a combination thereof.

As shown in FIG. 4, the method 400 may commence at operation 405, displaying a Graphical User Interface (GUI) (e.g., Graphical User Interface (GUI) 150), the graphical user interface receiving a business rule input from a business user.

At operation 410, the method 400 may proceed with receiving a policy from a policy engine based on the business rule input, the policy engine generating a policy hierarchy. For example, a user (e.g., a policy designer) may design the policy.

At operation 415, the method 400 may include defining a plurality of domain objects and a plurality of domain object representations in the Graphical User Interface (GUI) (e.g., Graphical User Interface (GUI) 150) based on the policy and the policy hierarchy.

At operation 420, the method 400 may proceed with defining an extensible hierarchical domain model definition using the policy hierarchy, the extensible hierarchical domain model definition being modified using the plurality of domain object representations in the Graphical User Interface (GUI) (e.g., Graphical User Interface (GUI) 150).

At operation 425, the method 400 may include defining a Policy Enforcement Point (PEP) in an application based on the extensible hierarchical domain model definition. For example, IT developers (e.g., a developer) may define Policy Enforcement Points (PEP) (e.g., Policy Enforcement Point (PEP) 220) and Policy Information Points (PIP). For instance, a developer may define Policy Enforcement Points (PEPs) (e.g., Policy Enforcement Point (PEP) 220) and make a policy service aware of the Policy Enforcement Points (PEPs).

At operation 430, the method 400 may proceed providing a mapping from the Policy Enforcement Point (PEP) (e.g., Policy Enforcement Point (PEP) 220) in the application to the plurality of domain object representations in the Graphical User Interface (GUI) (e.g., Graphical User Interface (GUI) 150).

At operation 435, the method 400 may include receiving, by the Policy Enforcement Point (PEP) (e.g., Policy Enforcement Point (PEP) 220), a user request to access a resource on the application, the user request comprising attributes of the user.

At operation 440, the method 400 may include sending, by the Policy Enforcement Point (PEP) (e.g., Policy Enforcement Point (PEP) 220), the user request to access the resource on the application to a Policy Decision Point (PDP).

At operation 445, the method 400 may include evaluating, by the Policy Decision Point (PDP), the user request to access the resource on the application, the evaluating using the extensible hierarchical domain model definition.

At operation 450, the method 400 may include generating, by the Policy Decision Point (PDP), a decision regarding the user request to access the resource on the application.

At operation 455, the method 400 may include enforcing, by the Policy Enforcement Point (PEP) (e.g., Policy Enforcement Point (PEP) 220), the decision regarding the user request to access the resource on the application.

Figure 5:
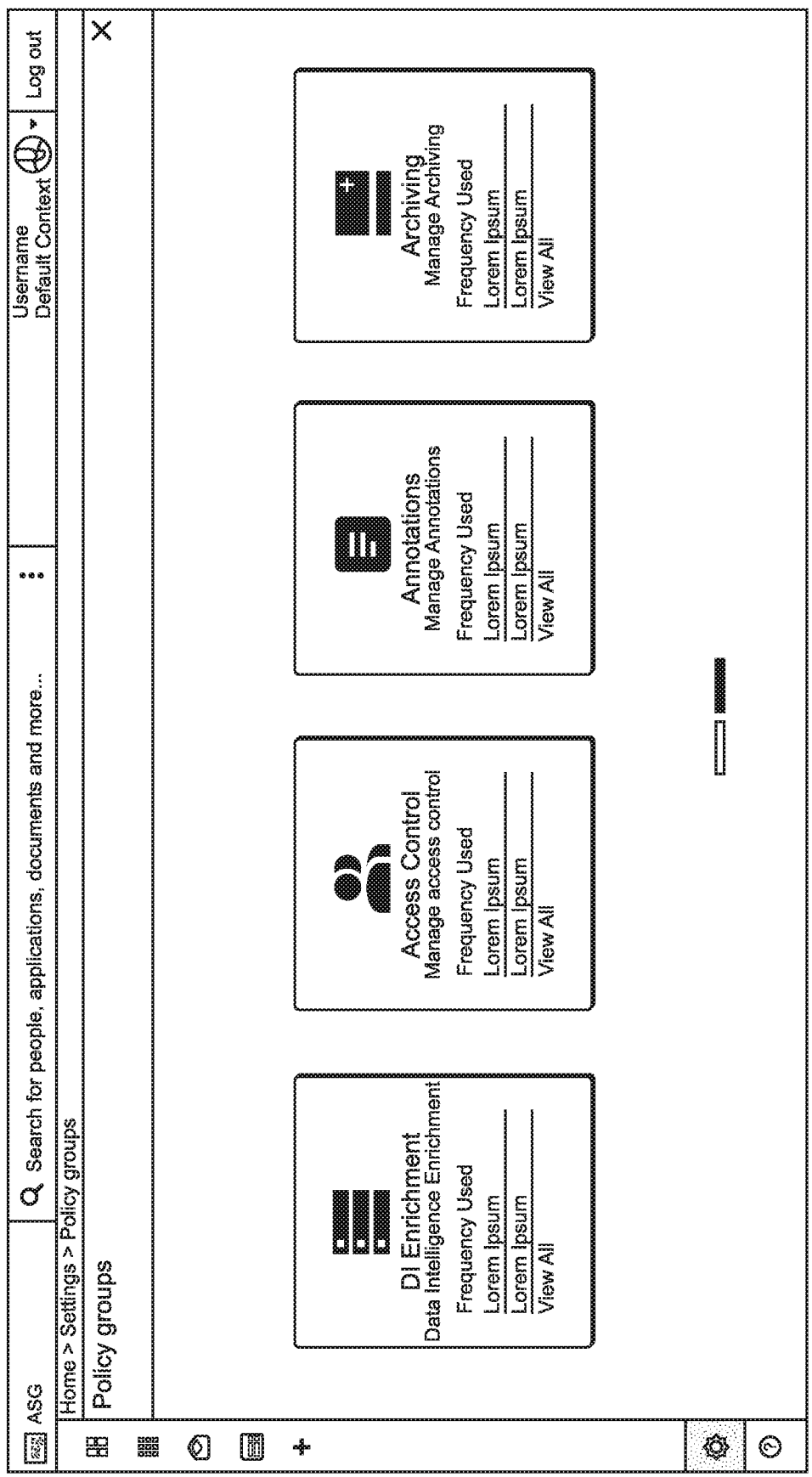
FIG. 5 illustrates a Graphical User Interface (GUI) showing a dashboard including policy groups for secure policies-based information governance, in accordance with various embodiments of the present technology.

FIG. 5 illustrates a Graphical User Interface (GUI) (e.g., Graphical User Interface (GUI) 150) showing a dashboard including policy groups for secure policies-based information governance, in accordance with various embodiments of the present technology. For example, the Graphical User Interface (GUI) of FIG. 5 shows the initial dashboard a user (e.g., a business user) may use to define one or more policies and have the one or more policies adhered to by applications. For example, the Graphical User Interface (GUI) of FIG. 5 shows policy groups.

FIG. 6 illustrates a Graphical User Interface (GUI) (e.g., Graphical User Interface (GUI) 150) showing a subject heading of policy groups, sub-heading access control of reports including a table of policies comprising a policy hierarchy for secure policies-based information governance, in accordance with various embodiments of the present technology. For example, the Graphical User Interface (GUI) of FIG. 6 shows a description of business rules including marketing departmental access, sales department access, accounting access, and so forth, that correspond to policies. Furthermore, the Graphical User Interface (GUI) of FIG. 6 shows the access controls for the business rules including view, print, download, access, and so forth.

Figure 7:
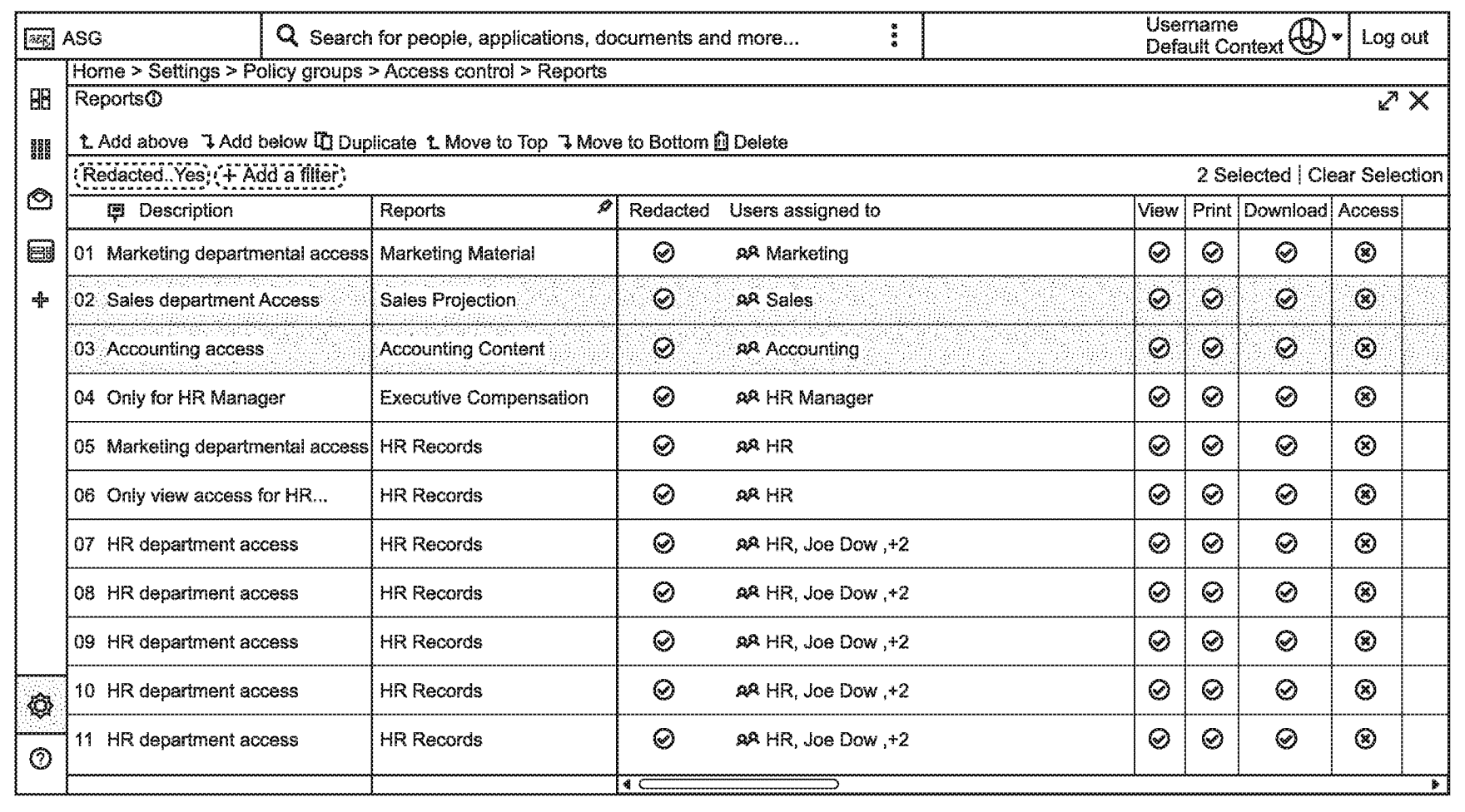

FIG. 7 illustrates a Graphical User Interface (GUI) (e.g., Graphical User Interface (GUI) 150) showing two selected business rules of a table of business rules comprising a policy hierarchy for secure policies-based information governance, after a user selects the subject heading of policy groups, sub-heading access control of reports of FIG. 6, in accordance with various embodiments of the present technology. For example, the Graphical User Interface (GUI) of FIG. 7 shows a user (e.g., a business user) selecting two business rules, sales departmental access and accounting access, for secure policies-based information governance enabled by the present technology.

FIG. 8 illustrates a Graphical User Interface (GUI) (e.g., Graphical User Interface (GUI) 150) showing two selected policies including a description of a table of policies comprising a policy hierarchy and a policy description for secure policies-based information governance, in accordance with various embodiments of the present technology. For example, the Graphical User Interface (GUI) of FIG. 8 shows a user (e.g., a business user) selecting the two business rules and also shows a description of the table and the policies for secure policies-based information governance enabled by the present technology.

FIG. 9 illustrates a Graphical User Interface (GUI) (e.g., Graphical User Interface (GUI) 150) showing two business rules of a table of policies comprising a policy hierarchy have been deleted successfully for secure policies-based information governance in accordance with various embodiments of the present technology. For example, the Graphical User Interface (GUI) of FIG. 9 shows a user (e.g., a business user) having successfully deleted two business rules, for secure policies-based information governance enabled by the present technology.

Figure 10:
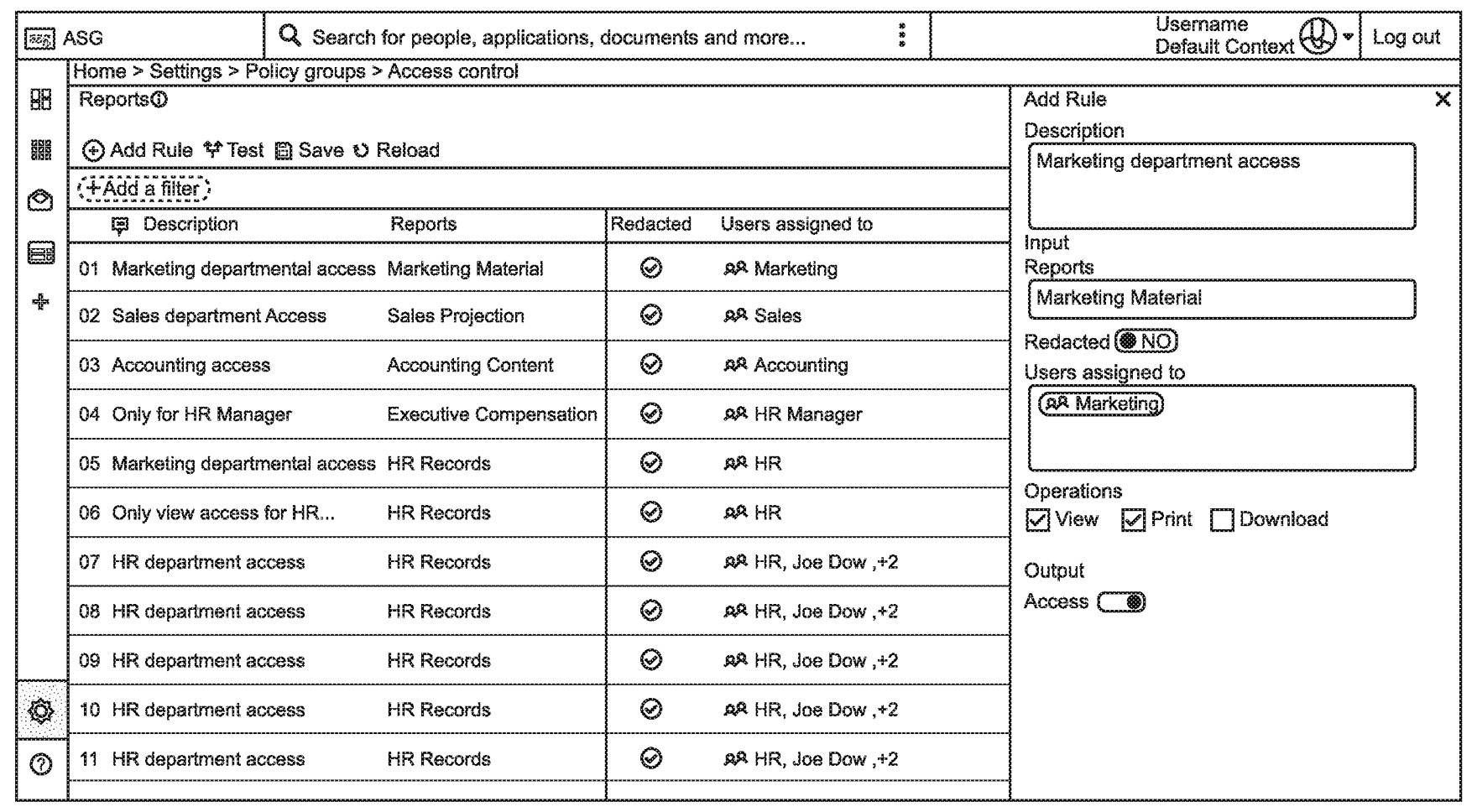

FIG. 10 illustrates a Graphical User Interface (GUI) (e.g., Graphical User Interface (GUI) 150) showing adding a business rule to a table of policies comprising a policy hierarchy for secure policies-based information governance in accordance with various embodiments of the present technology. For example, the Graphical User Interface (GUI) of FIG. 10 shows a user (e.g., a business user) providing a business rule input for secure policies-based information governance enabled by the present technology. For instance, FIG. 10 shows displaying of a Graphical User Interface (GUI), the graphical user interface receiving the business rule input from a business user.

FIG. 11 illustrates a Graphical User Interface (GUI) (e.g., Graphical User Interface (GUI) 150) showing adding access controls to the business rule for secure policies-based information governance in accordance with various embodiments of the present technology. For example, the Graphical User Interface (GUI) of FIG. 11 shows a user (e.g., a business user) allowing access control to the business rule input. For instance, a business user may allow access to marketing material by marketing users for secure policies-based information governance enabled by the present technology. In some instances, allowing access results in the decision regarding the user request to access the resource on the application is to grant access to the resource based on the policy; and the enforcing, by the Policy Enforcement Point (PEP), the decision regarding the user request to access the resource on the application is granting access to the resource on the application. In other instances, not allowing access (i.e., disabling access) results in the decision regarding the user request to access the resource on the application is to deny access to the resource based on the policy; and the enforcing, by the Policy Enforcement Point (PEP), the decision regarding the user request to access the resource is denying access to the resource on the application.

FIG. 12 illustrates a Graphical User Interface (GUI) (e.g., Graphical User Interface (GUI) 150) showing adding policy hierarchy data to a policy of a table of policies comprising a policy hierarchy for secure policies-based information governance in accordance with various embodiments of the present technology. For example, the Graphical User Interface (GUI) of FIG. 12 shows the result of a business user input of FIG. 11 displayed of Graphical User Interface (GUI) for secure policies-based information governance enabled by the present technology.

Figure 13:
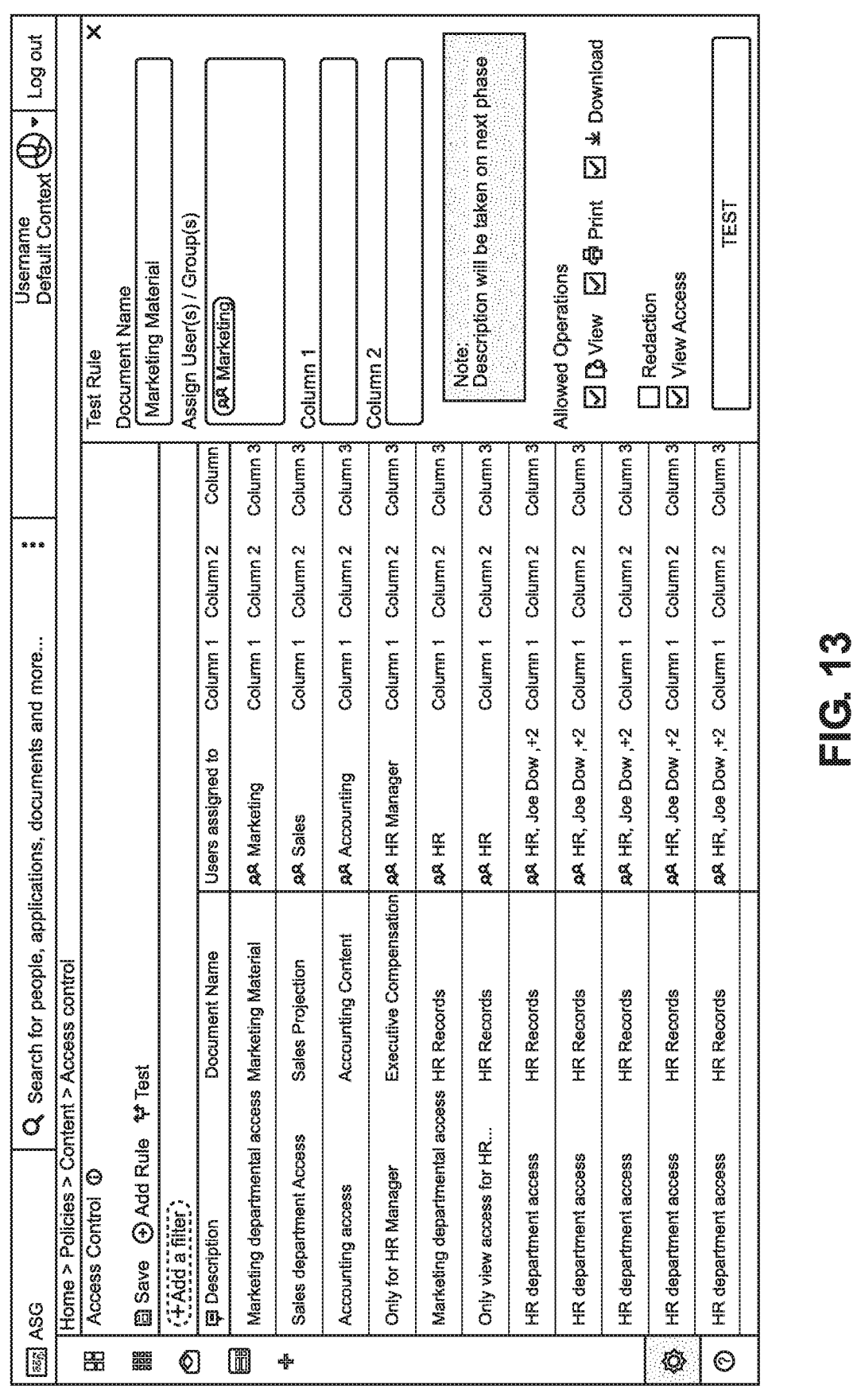

FIG. 13 illustrates a Graphical User Interface (GUI) (e.g., Graphical User Interface (GUI) 150) showing the enabling of a user to test a business rule input for secure policies-based information governance in accordance with various embodiments of the present technology. For example, the Graphical User Interface (GUI) of FIG. 13 shows a business user testing the business rule input of FIG. 11.

FIG. 14 illustrates a Graphical User Interface (GUI) (e.g., Graphical User Interface (GUI) 150) showing the enabling of a user to save a business rule after testing for secure policies-based information governance in accordance with various embodiments of the present technology. For example, the Graphical User Interface (GUI) of FIG. 14 shows a business user saving the business rule input after testing as shown in FIG. 13.

FIG. 15 illustrates a Graphical User Interface (GUI) showing a policy designer screen including hierarchy data to a policy for secure policies-based information governance in accordance with various embodiments of the present technology. For example, a user (e.g., a policy designer) may enable or disable all rules on a particular Policy Enforcement Point (PEP). For instance, policy designer may disable a Policy Enforcement Point (PEP) so no rules may be created for the Policy Enforcement Point (PEP) using the policy designer screen. In some instances, by default a Policy Enforcement Point (PEPs) are enabled. In some instances, the policy designer screen for the business user may receive a disable policy enforcement point input, the disable policy enforcement point input disabling the Policy Enforcement Point (PEP) preventing the Policy Enforcement Point (PEP) from enforcing the policy. In other instances, the policy designer screen for the business user may receive an enable policy enforcement point input, the enable policy enforcement point input enabling the Policy Enforcement Point (PEP) allowing the Policy Enforcement Point (PEP) to enforce the policy.

Figure 16:
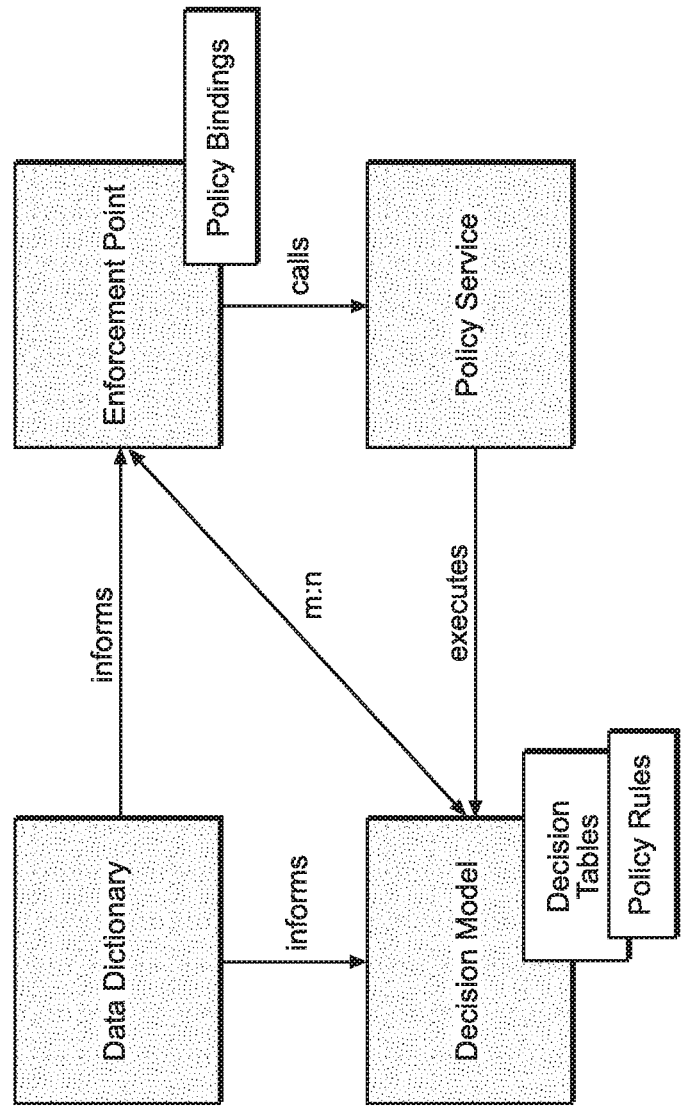
FIG. 16 illustrates a pictorial diagram of policy artifacts for secure policies-based information governance, according to exemplary embodiments of the present technology.

FIG. 16 illustrates a pictorial diagram of policy artifacts for secure policies-based information governance, according to exemplary embodiments of the present technology. For example, the diagram of policy artifacts for secure policies-based information governance of FIG. 16 shows a domain model (also referenced as a data dictionary), an enforcement point (e.g., Policy Enforcement Point (PEP) 220), decision model, and policy service. The domain model (e.g., data dictionary) may comprise type definitions used by IT developers (e.g., a developer). The enforcement point (e.g., Policy Enforcement Point (PEP) 220) enables policy binding and may include Java annotations used by IT developers (e.g., a developer). The policy service comprises a client Application Programming Interface (API) (e.g., Java Aspects, Java API, REST) and the policy service may be standalone or embedded. The decision model comprises a decision table including input data (e.g., columns), output decision (e.g., columns), policy rules (rows), and match criteria.

Figure 17:
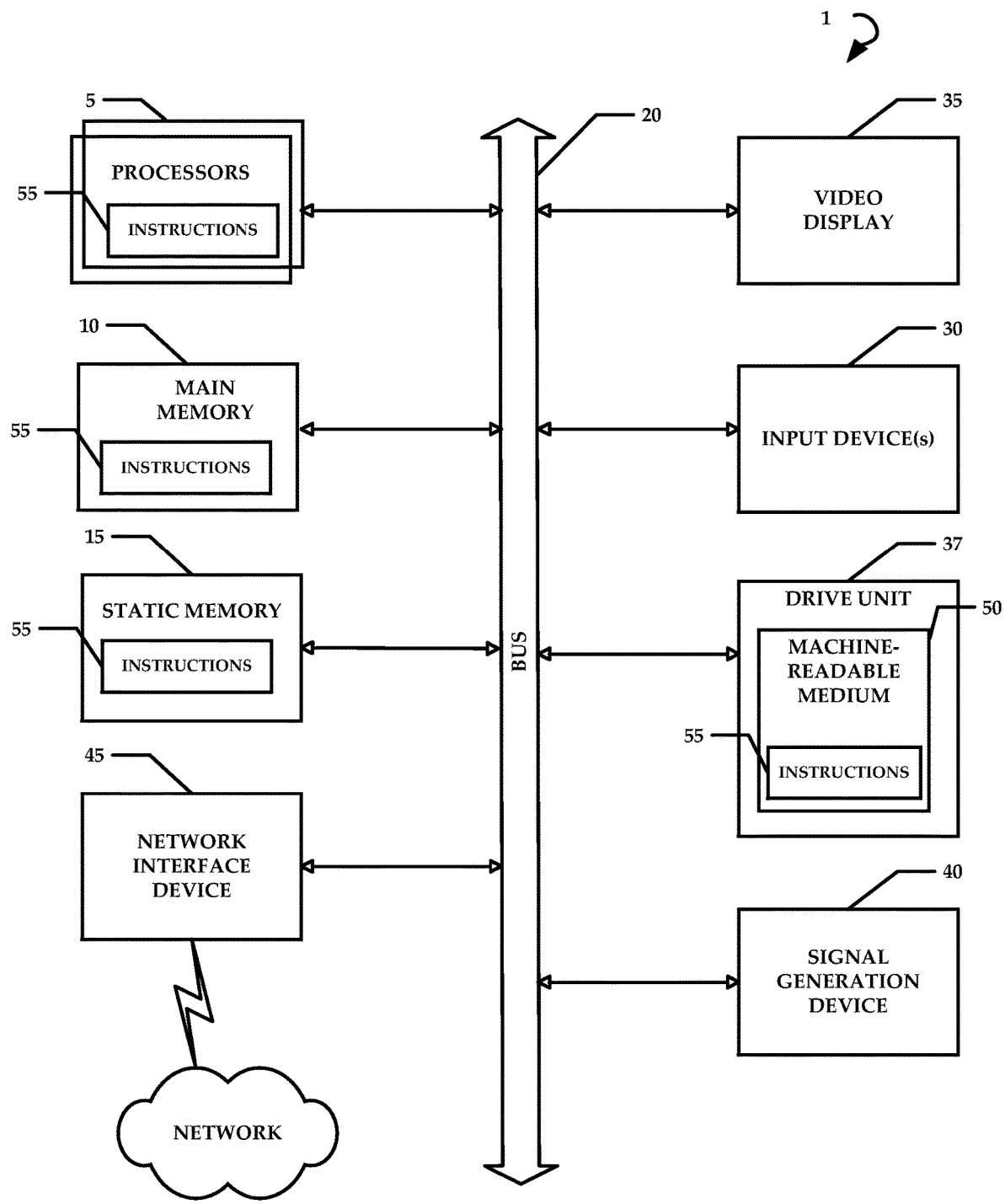
FIG. 17 illustrates an exemplary computer system that may be used to implement embodiments of the present disclosure.

FIG. 17 illustrates an exemplary computer system that may be used to implement embodiments of the present technology according to various embodiments. FIG. 17 illustrates a computer system for implementing embodiments according to exemplary embodiments of the present technology. FIG. 17 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for secure policies-based information governance, the method comprising:
    displaying a Graphical User Interface (GUI), the graphical user interface receiving a business rule input from a business user;
    receiving a policy from a policy engine based on the business rule input and at least one guardrail policy comprising a rule having a level of precedence higher than the business rule of the business rule input, the policy engine generating a policy hierarchy;
    defining a plurality of domain objects and a plurality of domain object representations in the Graphical User Interface (GUI) based on the policy, the at least one guardrail policy, and the policy hierarchy;
    defining an extensible hierarchical domain model definition using the policy hierarchy, the extensible hierarchical domain model definition being modified using the plurality of domain object representations in the Graphical User Interface (GUI);
    defining a Policy Enforcement Point (PEP) in an application based on the extensible hierarchical domain model definition;

providing a mapping from the Policy Enforcement Point (PEP) in the application to the plurality of domain object representations in the Graphical User Interface (GUI);

receiving, by the Policy Enforcement Point (PEP), a user request to access a resource on the application, the user request comprising attributes of the business user;

sending, by the Policy Enforcement Point (PEP), the user request to access the resource on the application to a Policy Decision Point (PDP);

evaluating, by the Policy Decision Point (PDP), the user request to access the resource on the application, the evaluating using the extensible hierarchical domain model definition;

generating, by the Policy Decision Point (PDP), a decision regarding the user request to access the resource on the application based on the evaluating; and enforcing, by the Policy Enforcement Point (PEP), the decision regarding the user request to access the resource on the application.

2. The method as recited in claim 1, wherein the evaluating, by the Policy Decision Point (PDP), the user request to access the resource further comprises:

sending, by the Policy Decision Point (PDP), an attribute evaluation request regarding the attributes of the business user to a Policy Information Point (PIP);

evaluating, using the Policy Information Point (PIP), the attributes of the business user, the evaluating using the extensible hierarchical domain model definition; and replying, by the Policy Information Point (PIP), to the attribute evaluation request based on the evaluating, using the Policy Information Point (PIP), of the attributes of the business user.

3. The method as recited in claim 2, wherein the evaluating, using the Policy Information Point (PIP), the attributes of the business user comprises using at least one of a decision model template, a decision table template, and a domain.

4. The method as recited in claim 3, wherein the evaluating, using the Policy Information Point (PIP), the attributes of the business user comprises using the decision table template, the decision table template comprising:

information for presenting the decision table template to the business user using the Graphical User Interface (GUI);

attributes of the plurality of domain objects; and formatting of the attributes of the plurality of domain objects for displaying on the Graphical User Interface (GUI).

5. The method as recited in claim 2, further comprising generating a custom domain model;

wherein the evaluating, using the Policy Information Point (PIP), the attributes of the business user comprises using the custom domain model.

6. The method as recited in claim 1, wherein the graphical user interface further comprises a policy designer screen for the business user, the policy designer screen receiving a disable policy enforcement point input, the disable policy enforcement point input disabling the Policy Enforcement Point (PEP) preventing the Policy Enforcement Point (PEP) from enforcing the policy.

7. The method as recited in claim 1, wherein the graphical user interface further comprises a policy designer screen for the business user, the policy designer screen receiving an enable policy enforcement point input, the enable policy enforcement point input enabling the Policy Enforcement Point (PEP) allowing the Policy Enforcement Point (PEP) to enforce the policy.

8. The method as recited in claim 1, wherein the decision regarding the user request to access the resource on the application is to deny access to the resource based on the policy and the at least one guardrail policy; and wherein the enforcing, by the Policy Enforcement Point (PEP), the decision regarding the user request to access the resource is denying access to the resource on the application.

9. The method as recited in claim 1, wherein the decision regarding the user request to access the resource on the application is to grant access to the resource based on the policy and the at least one guardrail policy; and wherein the enforcing, by the Policy Enforcement Point (PEP), the decision regarding the user request to access the resource on the application is granting access to the resource on the application.

10. A system for secure policies-based information governance, the system comprising:

a Graphical User Interface (GUI), the graphical user interface receiving a business rule input from a business user;

a policy engine generating a policy based on the business rule input and at least one guardrail policy comprising a rule having a level of precedence higher than the business rule of the business rule input, the policy engine generating a policy hierarchy;

at least one processor; and a memory storing processor-executable instructions, wherein the at least one processor is configured to implement the following operations upon executing the processor-executable instructions:

defining a plurality of domain objects and a plurality of domain object representations in the Graphical User Interface (GUI) based on the policy, the at least one guardrail policy, and the policy hierarchy;

defining an extensible hierarchical domain model definition using the policy hierarchy, the extensible hierarchical domain model definition being modified using the plurality of domain object representations in the Graphical User Interface (GUI);

defining a Policy Enforcement Point (PEP) in an application based on the extensible hierarchical domain model definition;

providing a mapping from the Policy Enforcement Point (PEP) in the application to the plurality of domain object representations in the Graphical User Interface (GUI);

receiving, by the Policy Enforcement Point (PEP), a user request to access a resource on the application, the user request comprising attributes of the business user;

sending, by the Policy Enforcement Point (PEP), the user request to access the resource on the application to a Policy Decision Point (PDP);

evaluating, by the Policy Decision Point (PDP), the user request to access the resource on the application, the evaluating using the extensible hierarchical domain model definition;

generating, by the Policy Decision Point (PDP), a decision regarding the user request to access the resource on the application based on the evaluating; and enforcing, by the Policy Enforcement Point (PEP), the decision regarding the user request to access the resource on the application.

11. The system as recited in claim 10, wherein the evaluating, by the Policy Decision Point (PDP), the user request to access the resource further comprises:
sending, by the Policy Decision Point (PDP), an attribute evaluation request regarding the attributes of the business user to a Policy Information Point (PIP);
evaluating, using the Policy Information Point (PIP), the attributes of the business user, the evaluating using the extensible hierarchical domain model definition; and
replying, by the Policy Information Point (PIP), to the attribute evaluation request based on the evaluating, using the Policy Information Point (PIP), of the attributes of the business user.

12. The system as recited in claim 11, wherein the evaluating, using the Policy Information Point (PIP), the attributes of the business user comprises using at least one of a decision model template, a decision table template, and a domain.

13. The system as recited in claim 12, wherein the evaluating, using the Policy Information Point (PIP), the attributes of the business user comprises using the decision table template, the decision table template comprising:
information for presenting the decision table template to the business user using the Graphical User Interface (GUI);
attributes of the plurality of domain objects; and
formatting of the attributes of the plurality of domain objects for displaying on the Graphical User Interface (GUI).

14. The system as recited in claim 11, wherein the at least one processor is further configured to implement the following operations upon executing the processor-executable instructions:
generating a custom domain model;
wherein the evaluating, using the Policy Information Point (PIP), the attributes of the business user comprises using the custom domain model.

15. The system as recited in claim 10, wherein the graphical user interface further comprises a policy designer screen for the business user, the policy designer screen receiving a disable policy enforcement point input, the disable policy enforcement point input disabling the Policy Enforcement Point (PEP) preventing the Policy Enforcement Point (PEP) from enforcing the policy.

16. The system as recited in claim 10, wherein the graphical user interface further comprises a policy designer screen for the business user, the policy designer screen receiving an enable policy enforcement point input, the enable policy enforcement point input enabling the Policy Enforcement Point (PEP) allowing the Policy Enforcement Point (PEP) to enforce the policy.

17. The system as recited in claim 10,
wherein the decision regarding the user request to access the resource on the application is to deny access to the resource based on the policy and the at least one guardrail policy; and
wherein the enforcing, by the Policy Enforcement Point (PEP), the decision regarding the user request to access the resource is denying access to the resource on the application.

18. The system as recited in claim 10,
wherein the decision regarding the user request to access the resource on the application is to grant access to the resource based on the policy and the at least one guardrail policy; and
wherein the enforcing, by the Policy Enforcement Point (PEP), the decision regarding the user request to access the resource on the application is granting access to the resource on the application.

19. A non-transitory computer readable medium having embodied thereon instructions being executable by at least one processor to perform operations for secure policies-based information governance, the operations comprising:
displaying a Graphical User Interface (GUI), the graphical user interface receiving a business rule input from a business user;
receiving a policy from a policy engine based on the business rule input and at least one guardrail policy comprising a rule having a level of precedence higher than the business rule of the business rule input, the policy engine generating a policy hierarchy;
defining a plurality of domain objects and a plurality of domain object representations in the Graphical User Interface (GUI) based on the policy, the at least one guardrail policy, and the policy hierarchy;
defining an extensible hierarchical domain model definition using the policy hierarchy, the extensible hierarchical domain model definition being modified using the plurality of domain object representations in the Graphical User Interface (GUI);
defining a Policy Enforcement Point (PEP) in an application based on the extensible hierarchical domain model definition;
providing a mapping from the Policy Enforcement Point (PEP) in the application to the plurality of domain object representations in the Graphical User Interface (GUI);
receiving, by the Policy Enforcement Point (PEP), a user request to access a resource on the application, the user request comprising attributes of the business user;
sending, by the Policy Enforcement Point (PEP), the user request to access the resource on the application to a Policy Decision Point (PDP);
evaluating, by the Policy Decision Point (PDP), the user request to access the resource on the application, the evaluating using the extensible hierarchical domain model definition;
generating, by the Policy Decision Point (PDP), a decision regarding the user request to access the resource on the application based on the evaluating; and
enforcing, by the Policy Enforcement Point (PEP), the decision regarding the user request to access the resource on the application.

20. The non-transitory computer readable medium of claim 19,
wherein the decision regarding the user request to access the resource on the application is to deny access to the resource based on the policy and the at least one guardrail policy; and
wherein the enforcing, by the Policy Enforcement Point (PEP), the decision regarding the user request to access the resource is denying access to the resource on the application.

* * * * *